United States Patent [19]

Ishikawa et al.

[11] Patent Number: 5,361,157
[45] Date of Patent: Nov. 1, 1994

[54] BIDIRECTIONAL LIGHT TRANSMISSION SYSTEM AND OPTICAL DEVICE THEREFOR

[75] Inventors: Tadasu Ishikawa; Mikio Maeda; Kimiyuki Oyamada; Shuichi Fujisawa; Yozo Utsumi; Kuniharu Takizawa, all of Tokyo, Japan

[73] Assignee: Nippon Hoso Kyokai, Tokyo, Japan

[21] Appl. No.: 934,959

[22] Filed: Aug. 25, 1992

[51] Int. Cl.$^5$ .............................................. G02B 6/12
[52] U.S. Cl. .................................. 359/168; 359/169; 359/170; 359/173; 385/9; 385/41; 385/44; 385/45; 385/46; 385/47; 385/39
[58] Field of Search ............... 359/143, 168, 169, 174, 359/113, 114, 112, 170, 156; 385/5, 9, 2, 3, 8, 10, 11, 14, 15, 40, 41, 44, 45, 46, 47; 370/85.1, 24, 29, 30, 124

[56] References Cited

U.S. PATENT DOCUMENTS

| | | | |
|---|---|---|---|
| 4,340,272 | 7/1982 | Papuchon et al. | 385/5 |
| 4,492,425 | 1/1985 | Kersten et al. | 385/47 |
| 4,684,207 | 8/1987 | Lawless | 385/2 |
| 4,850,666 | 7/1989 | Izutsu et al. | 385/5 |
| 4,879,763 | 11/1989 | Wood | 359/168 |
| 4,984,861 | 1/1991 | Suchoski et al. | 385/2 |
| 5,010,586 | 4/1991 | Mortimore et al. | 359/169 |
| 5,189,544 | 2/1993 | Sailer | 359/114 |

OTHER PUBLICATIONS

"Simultaneous Single-Fiber Transmission of Video and Bidirectional Voice/Data Using LiNbO3 Guided-Wave Devices", Murphy et al., pp. 937-945, Jun. 1988.
"Two-Way Transmission Using Electro-Optical Modulator", *Electronics Letters*, pp. 479-481, Apr. 1986, Wheeler et al.
"Optical Integrated Circuit", Nishihara et al., pp. 298-309, Feb. 1985.
*Papers of Technical Group on Optics and Quantum Electronics of I.E.I.C.E.*, 1986, Japan, "Recent Progress of Optical Integrated Circuit Devices", Nishihara, pp. 47-54.

Primary Examiner—Douglas W. Olms
Assistant Examiner—Huy D. Vu
Attorney, Agent, or Firm—Morgan & Finnegan

[57] ABSTRACT

A bidirectional light transmission system comprises a transmitting station having a light source for intensity-modulating a transmission signal, a first light branching portion for branching intensity-modulated light of the light source in a predetermined ratio and a first light receiving portion, and a receiving station having a second light branching portion, a light phase-modulating portion, a light reflecting portion and a second light receiving portion. The transmitting station transmits the intensity-modulated light via a single optical fiber transmission line to the receiving station connected thereto and receives a returned signal returned from the receiving station via the single optical fiber transmission line in the first light receiving portion, and the receiving station branches the transmitted light into first branched light and second branched light in the second light branching portion, phase-modulates at least one of the first branched light and second branched light in the light phase-modulating portion, transmits part of the first branched light and second branched light to the second light receiving portion via the light reflecting portion and simultaneously intensity-modulates reflected part of the first branched light and second branched light as a returned signal in the light phase-modulating portion and the second light branching portion, and returns the returned signal to the transmitting station via the single optical fiber transmission line.

18 Claims, 18 Drawing Sheets

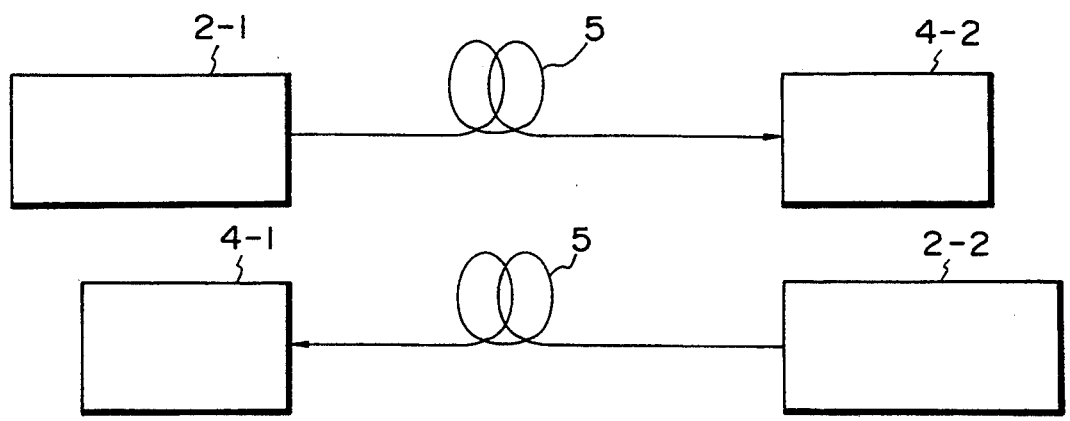
FIG. 1A *(PRIOR ART)*
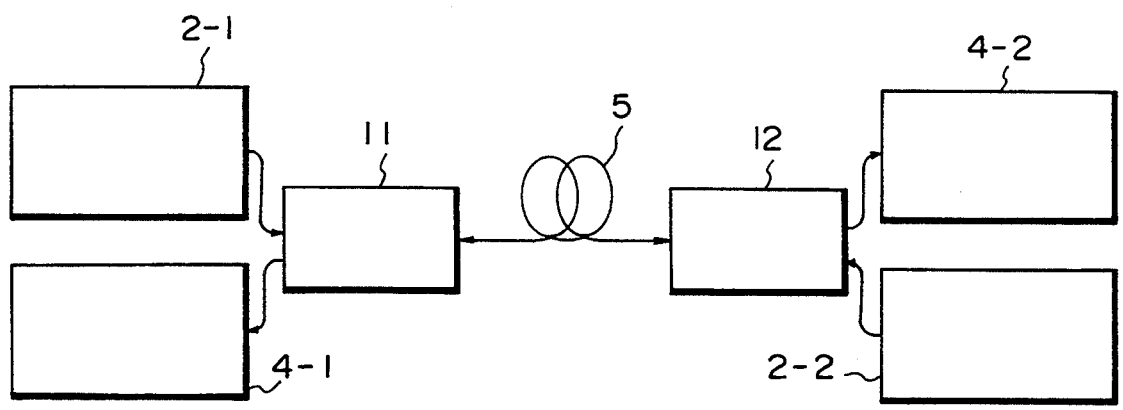
FIG. 1B *(PRIOR ART)*
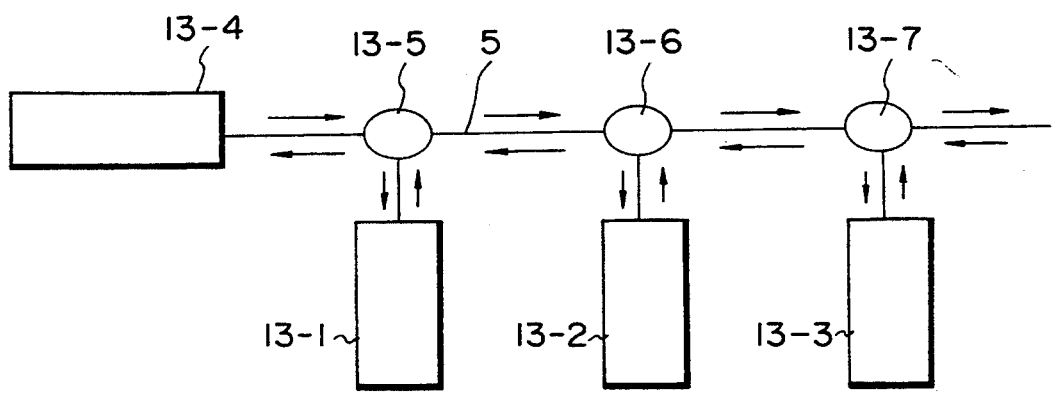
FIG. 1C *(PRIOR ART)*

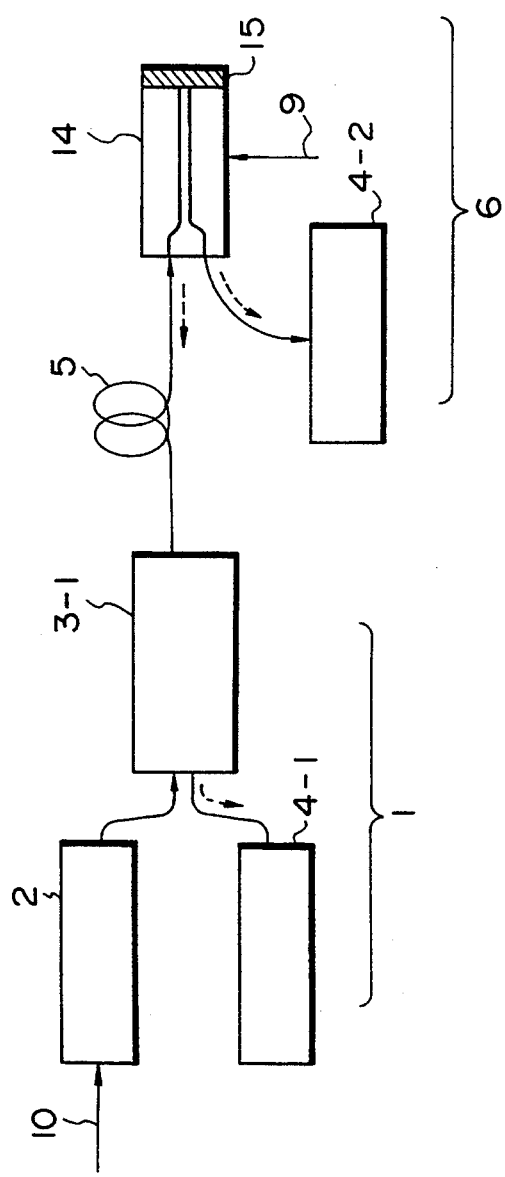
FIG.1D *(PRIOR ART)*
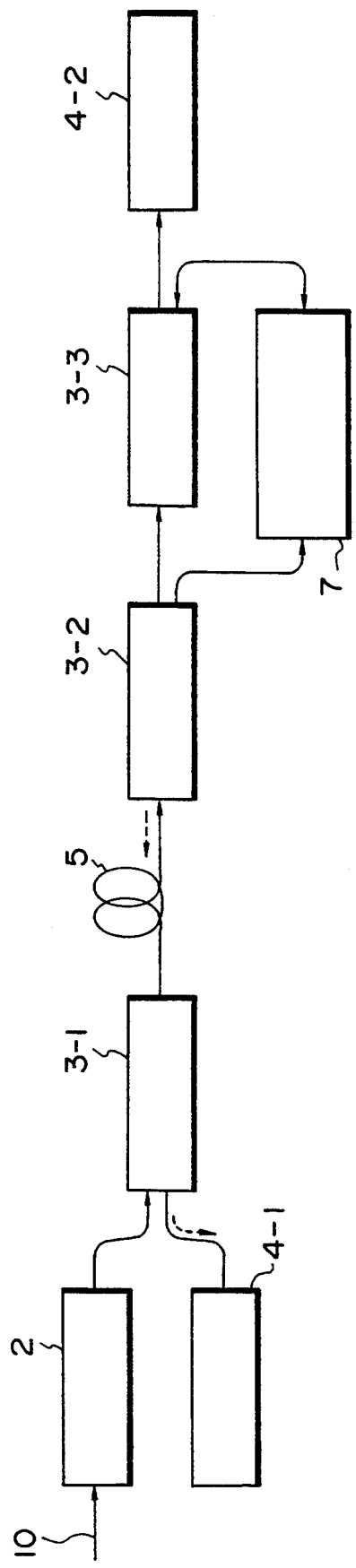
FIG.1E *(PRIOR ART)*

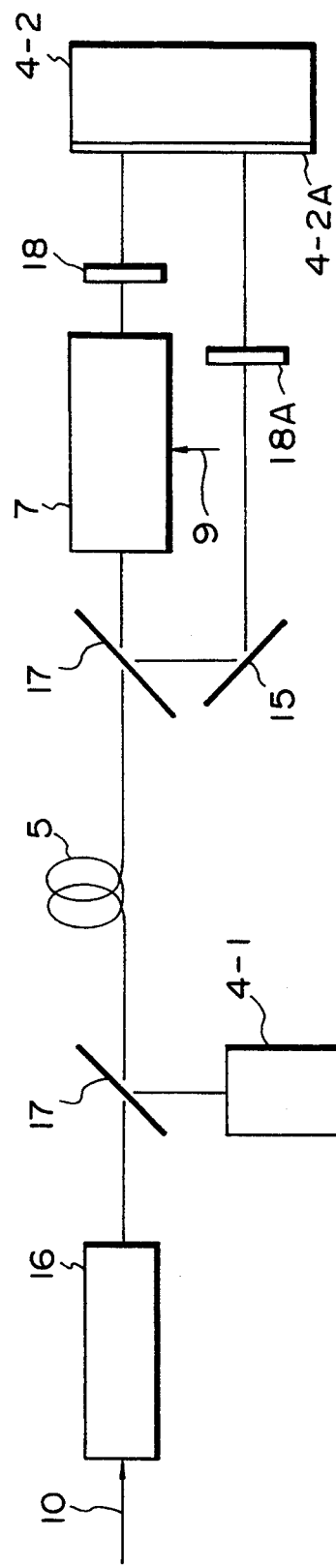
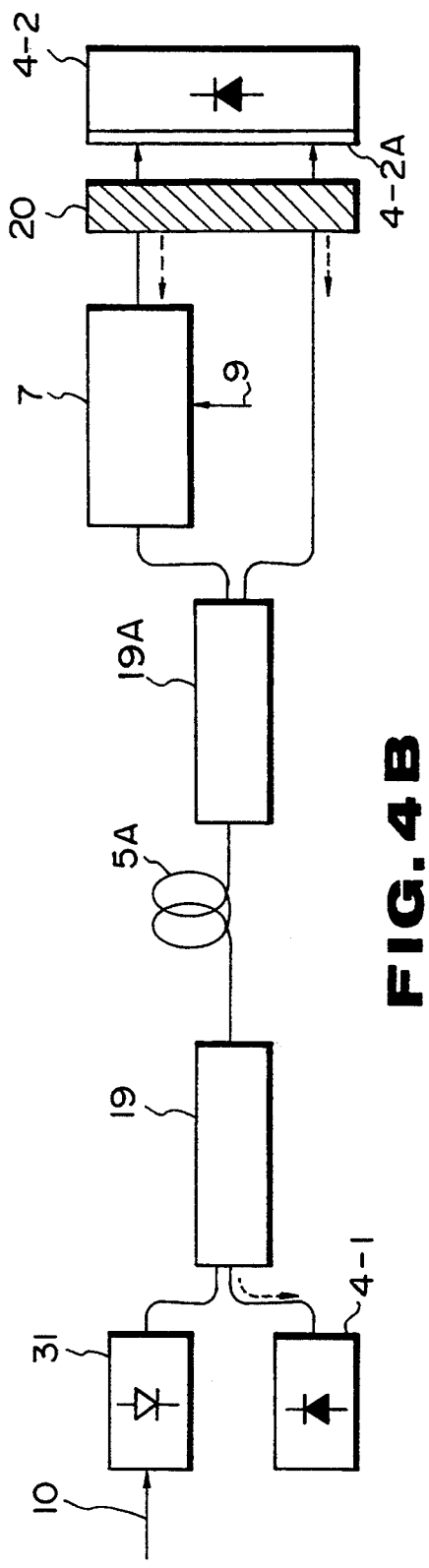
FIG.4A
FIG.4B

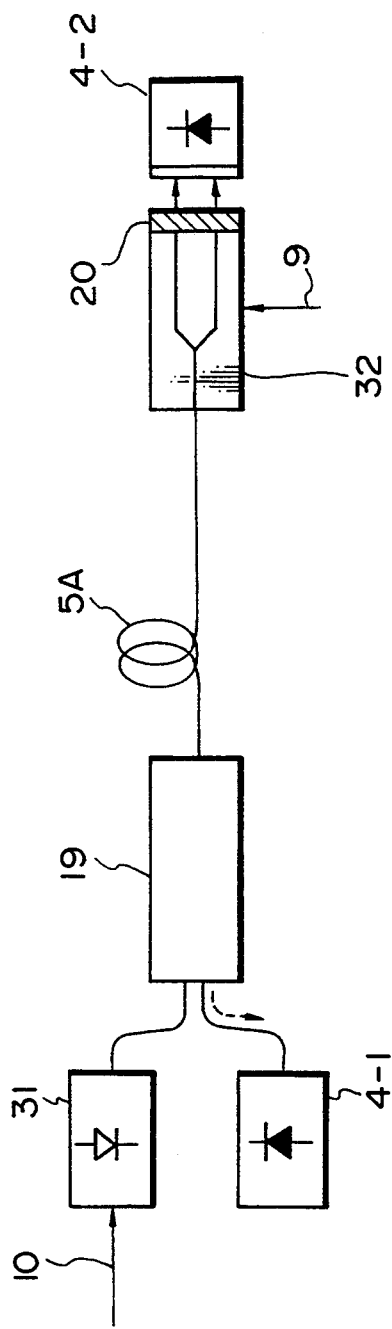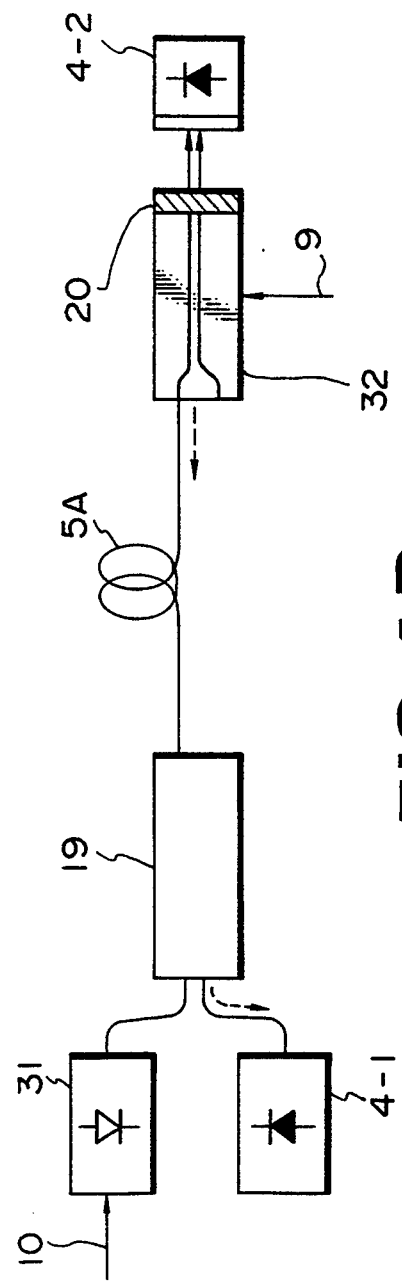

BIDIRECTIONAL LIGHT TRANSMISSION SYSTEM AND OPTICAL DEVICE THEREFOR

BACKGROUND OF THE INVENTION

1. Field of the invention

The present invention relates to a bidirectional light transmission system between transmitting and receiving terminals connected to a single optical fiber cable, and more particularly to a bidirectional light transmission system effective to optical CATV or the like and an optical device therefor.

2. Description of the prior art

As shown in FIGS. 1A to 1C, a conventional bidirectional light transmission system has used the multiplex technique. FIG. 1A illustrates an example of a space division wavelength multiplex technique as the multiplex technique. Reference numerals 2-1, 2-2, 4-1, 4-2 and 5 are a light source of a wavelength λ1, a light source of a wavelength λ2, light receivers and a transmission line respectively. FIG. 1B illustrates an example to which the wavelength multiplex technique is applied. In FIG. 1B, reference numerals 11 and 12 are an optical multiplexer and an optical demultiplexer respectively, and there is a single transmission line. FIG. 1C is an example to which a time division multiplex technique is applied. Reference numerals 13-1, 13-2 and 13-3 are terminals, reference numeral 13-4 is a center terminal, and reference numerals 13-5, 13-6 and 13-7 are nodes. The multiplex systems illustrated in FIGS. 1A to 1C are used alone or in combination with another. In particular, the time division multiplex technique has been widely used to an optical LAN (local area network) or the like.

Recently, a bidirectional light transmission system is used, in which a light source is not necessary for a receiving station because of the use of an electrooptic modulator. For example, E. J. MURPHY et al. has reported a bidirectional light transmission system as shown in FIG. 1D, in which a reflective external modulator 14 with a total reflecting mirror 15 at one end thereof is provided, and hence a light source is not necessary at a light receiving point of the system ("Simultaneous Single-Fiber Transmission of Video and Bidirectional Voice/Data Using LiNbO₃ Guided-Wave Devices", *JOURNAL OF LIGHTWAVE TECHNOLOGY*, Vol. 6, No. 6, pp. 937-945, June 1988). In FIG. 1D, reference numerals 1, 6 and 3-1 are a transmitting station, a receiving station and a light branching portion. Reference numerals 9 and 10 are a return signal and a transmission signal, respectively. J. K. WHEELER et al. has reported a combination system of two optical splitters, 3-2 and 3-3 and an optical phase modulator 7 as shown in FIG. 1E ("Two-way Transmission using Electro-Optical Modulator" *ELECTRONICS LETTERS*, 24th, April 1986, Vol. 22, No. 9 pp.479-481). In these two systems shown in FIGS. 1D and 1E, a video signal with a high bit rate is transmitted from a transmitting station and a sound signal or a data signal with a low bit rate is transmitted from a receiving station.

The conventional transmission systems shown in FIGS. 1A to 1C require a plurality of light sources and have a problem on their construction, reliability and economy.

The conventional transmission system shown in FIG. 1D has an advantage that a light source is not required at a receiving point, but has a disadvantage that a transmitted signal is disturbed by an external modulator 14. Consequently, a measure is necessary for removing the disturbance at a transmitting station or a receiving station.

In the conventional transmission system shown in FIG. 1E, two light branching devices 3-2 and 3-3 are used. Since, however, optical loss of at least 3 dB or more is generated, a level of received light is markedly lowered. Moreover, since reflected light passes through the light branching device again, far more optical loss is generated. An amount of reflected light is determined by the number of light branching device, and hence flexible design suitable for the system can not be made. Moreover, the system shown in FIG. 1E has a disadvantage that a modulation ratio is limited by the difference between the optical path lengths of two reflected light beams or the like.

In the bidirectional light transmission system, various optical devices such as an optical modulator and an optical switch are used.

The conventional optical modulator is a device of a transmission type and dependent on polarization of light. In general, an LiNbO₃ crystal is used for a substrate, and a waveguide is formed on a Z-cut LiNbO₃. Light is transmitted in the X axis direction, and an electric field is applied in the Z axis direction.

FIG. 2A illustrates an example of such a conventional optical modulator (see Nishihara, Haruna and Suhara, *OPTICAL INTEGRATED CIRCUIT*, pp.298-309, Ohmu Co., Ltd, 1985). In FIG. 2A, reference numerals 21, 22, 23 and 26 are a crystal substrate, an optical waveguide, a Y shape branched waveguide or a directional coupling waveguide, and an electrode respectively. Since constructed as described above, the conventional optical modulator shown in FIG. 2A has different electrooptic coefficients: an electrooptic coefficient in a TE mode and an electrooptic coefficient in a TM mode. Generally, light in a TM mode can be only modulated because the electrooptic coefficient can be made large.

Moreover, as shown in FIG. 2B, a reflective optical modulator having a light reflecting portion 24 is used. Reference numeral 27 is an asymmetrical X branched waveguide. The optical modulator also depends on polarization of light and has a total reflection type reflector (see Nishihara, "Recent Progress of Optical Integrated Circuit Devices", *PAPERS OF TECHNICAL GROUP ON OPTICS AND QUANTUM ELECTRONICS OF I.E.I.C.E JAPAN*, Vol. OQE86, No.123, pp. 47-54).

The conventional optical modulator shown in FIG. 2A depends on polarization of light. If a specific optical fiber for maintaining a plane of polarization is not used, the optical modulator can be only used just after a light source (semiconductor laser or the like). Furthermore, the conventional optical modulator shown in FIG. 2B depends on polarization of light, has a total reflection type reflector and the use thereof is limited to a special field of a thermal sensor, a pressure sensor or the like.

On the other hand, there are few examples of a reflective optical switch having a light reflecting portion, and there is only a device having a wavelength filter at its light reflecting portion (see E. J. MURPHY et al. "Simultaneous Single-Fiber Transmission of Video Bidirectional Voice/Data Using LiNbO3 Guided-Wave Devices", *JOURNAL OF LIGHTWAVE TECHNOLOGY*, Vol. 6, No. 6 June 1988) . FIG. 2C illustrates the above conventional optical switch. In the optical switch, there are provided optical waveguides 22 and 22' on a Z-cut LiNbO₃ substrate 21, an electrode 26 for applying an electric field in the Z axis direction of the crystal and a light reflecting portion 24. The optical waveguides 22 and 22' approach each other to construct an optical directional coupler and turn on or off a light input to a light receiving portion by presence or absence of a voltage applied to the electrode 26. This means that the optical device functions as an optical switch independent of polarization of light.

When an optical switching operation independent of polarization of light is realized in an optical directional coupler, for realizing a complete cross state is, it is necessary to match three parameters with high accuracy, i.e., a shape(phase constant), intensity of coupling and a coupling length of an optical waveguide (phase constant ) . Thus, severe manufacturing requirements and high fabricating accuracy are needed. Additionally, switching characteristics vary depending on a light wavelength or a difference in temperatures. The above directional coupling optical switch independent of polarization of light has such a disadvantage that the manufacturing requirements are rigidly restricted and a high operation voltage of 30 V to 70 V is necessary.

An optical switch shown in FIG. 2C is also usable for an optical modulator. Since, however, this device is a total reflecting type and a light receiver 25 thereof receives a switching light output, signal light superposed on incident light is disturbed by a modulation signal of the optical modulator. Moreover, in some cases, the received light disappears. Since a substrate is a Z-cut LiNbO₃ crystal, light is affected by birefringence, and hence analog modulation thereof is hardly made, characteristics of a modulation factor and an extinction ratio are poor and signal light may be easily affected by polarization of light and manufacturing of the device is very difficult, and the like.

SUMMARY OF THE INVENTION

It is an object of the present invention to provide a compact and high reliable bidirectional transmission system in which the above problems are solved, interference between bidirectional signals is suppressed and an optical loss is reduced.

It is another object of the present invention to provide a compact and high reliable optical device by utilizing it a light signal can be transmitted and received by a single light source and an optical loss is small so as to eliminate the above defects.

It is further another object of the present invention to provide an optical device with a simple and compact structure and having functions of switching and modulating light at a low voltage independently of polarization of light, and further transmitting and receiving the light.

In the first aspect of the present invention, a bidirectional light transmission system comprises a transmitting station having a light source for intensity-modulating a transmission signal, a first light branching portion for branching intensity-modulated light of the light source in a predetermined ratio, and a first light receiving portion; and a receiving station having a second light branching portion, a light phase-modulating portion, a light reflecting portion, and a second light receiving portion, wherein the transmitting station transmits the intensity-modulated light via a single optical fiber transmission line to the receiving station connected thereto and receives a returned signal returned from the receiving station via the single optical fiber transmission line in the first light receiving portion, and the receiving station branches the transmitted light into first branched light and second branched light in the second light branching portion, phase-modulates at least one of the first branched light and second branched light in the light phase-modulating portion, transmits part of the first branched light and second branched light to the second light receiving portion via the light reflecting portion and simultaneously intensity-modulates reflected part of the first branched light and second branched light as a returned signal in the light phase-modulating portion and the second light branching portion, and returns the returned signal to the transmitting station via the single optical fiber transmission line.

Here, the reflected part of the first branched light and second branched light may not be returned from the receiving station to the transmitting station when there is no return signal.

The transmitting station may further comprise a signal selector, and may prepare a plurality of multiplex transmitted signals so as to be transmitted to the receiving station at a higher carrier frequency, and the receiving station may return a selection signal for selecting and transmitting any one of the plurality of multiplex transmitted signals at a lower carrier frequency so as not to overlap the plurality of multiplex transmitted signals, and the selection signal may drive the signal selector.

A semiconductor laser may be used as the light source, a photocoupler or an optical circulator with an m:n ratio may be used as the first light branching portion, an optical integrated circuit being integrated on a crystal substrate of glass, semiconductor or ferroelectric materials may be used as the second light branching portion, the light reflecting portion and the second light receiving portion, and a single mode optical fiber may be used for the optical fiber transmission line.

In the second aspect of the present invention, an optical modulator comprises a body of the optical modulator comprising a single mode optical waveguide for transmitting incident light, a light branching portion for branching light to be transmitted in the single mode optical waveguide into first branched light and second branched light, a light intensity modulating portion having parallel electrodes for phase-modulating each of the first branched light and second branched light, a light reflector being provided on an edge surface opposite to an incident side for reflecting part of light, and a light receiver for simultaneously collecting part of the first branched light and second branched light which are not reflected but transmitted through the light reflector without uniting or mode-coupling the part of the first branched light and second branched light.

Here, the light branching portion may be a Y shape branched optical waveguide.

The light branching portion may be a directional coupling waveguide.

A single mode optical fiber may be provided at a light incident portion of the optical modulator body and the body of the optical modulator may have modulation characteristics independent of polarization of light.

The body of the optical modulator having the modulation characteristics independent of polarization of light may be made on an X-cut LiNbO₃ crystal substrate and has a Y shape branching phase modulating portion, and light may be transmitted in the Z axis direction of the crystal and an electric field may be applied in the Y axis direction thereof.

An effective refractive index control unit may be provided on the light branching portion.

An incident edge surface of the body of the optical modulator to which the single mode optical fiber is connected, may be anti-reflection coated, and a light receiving surface of the light receiver may be anti-reflection coated or may be attached obliquely to an edge surface of the optical modulator so that reflected light from the light receiving surface are not returned to the body of the optical modulator.

A multi-mode optical fiber may be used for collecting light by the light receiver.

In the third aspect of the present invention, an optical device comprises an optical waveguide being formed on a substrate and having an asymmetrical Y shape branched waveguide and a branching interference type light modulating portion, an electrode for applying an electric field to two branched waveguides constituting the branching interference type light modulating portion in order to perform a switching operation, an effective refractive index control unit being provided on at least one of the two branched waveguides and independent of the applied voltage, and a light receiving portion and a light reflecting portion being provided on any one of an incident edge and an output edge of the optical waveguide.

Here, an asymmetrical Y shape branched waveguide may be provided on an incident side of the optical waveguide and a reflective branching interference type light modulating portion may be provided on an output side of the optical waveguide.

The reflecting portion may be a total light reflector, two optical fibers are attached to an edge of the asymmetrical Y shape branched waveguide on the incident side, and a light receiving portion may be attached to one edge of the two optical fibers.

Part of incident light may be transmitted through the light reflecting portion, a light receiver may be attached just after the light reflecting portion, and two single mode optical fibers may be connected to the edge of the asymmetrical Y shape branched waveguide on the incident side.

The substrate may be made of an LiNbO$_3$ or LiTaO$_3$ crystal, light may be transmitted in the Z axis direction of the crystal and an electric field may be applied in the Y axis direction thereof.

The crystal substrate may be made of an LiNbO$_3$ or LiTaO$_3$ crystal, light may be transmitted in the X axis direction of the crystal and an electric field may be applied in the Z axis direction thereof.

The above and other objects, effects, features and advantages of the present invention will become more apparent from the following description of embodiments thereof taken in conjunction with the accompanying drawings.

BRIEF DESCRIPTION OF THE DRAWINGS

FIGS. 1A to 1E are block diagrams explaining a conventional bidirectional light transmission system respectively;

FIGS. 4A to 4E are block diagrams illustrating embodiments of a bidirectional light transmission system according to the present invention, respectively;

DETAILED DESCRIPTION OF PREFERRED EMBODIMENTS

With reference to the accompanying drawings, the present invention will be described below in more detail.

Figure 2A:
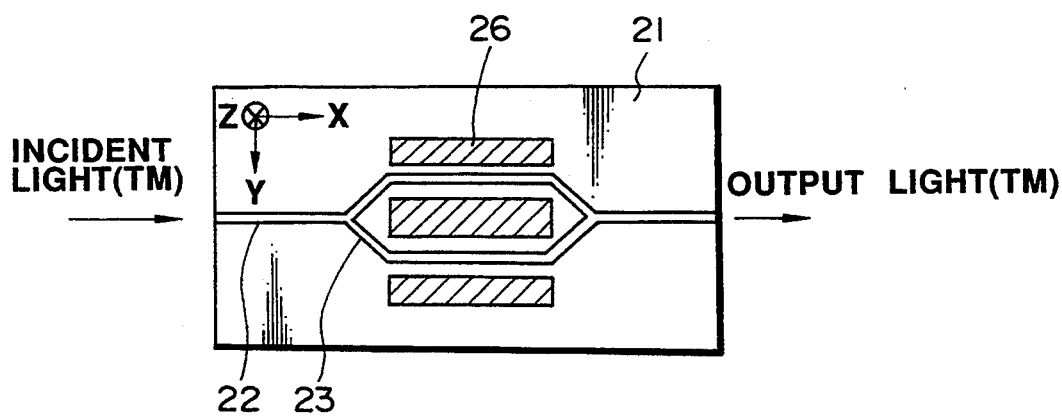
FIGS. 2A and 2B are plan views illustrating a conventional optical modulator respectively.
Figure 2B:
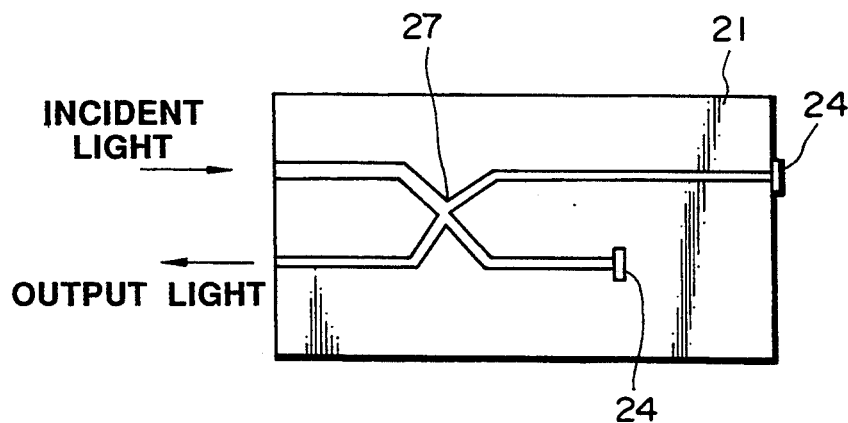
Figure 2C:
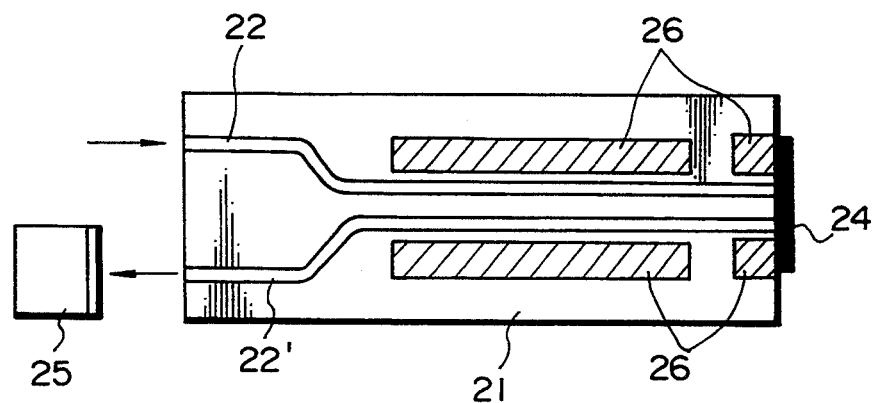
FIG. 2C is a plan view illustrating a conventional optical switch.
Figure 3:
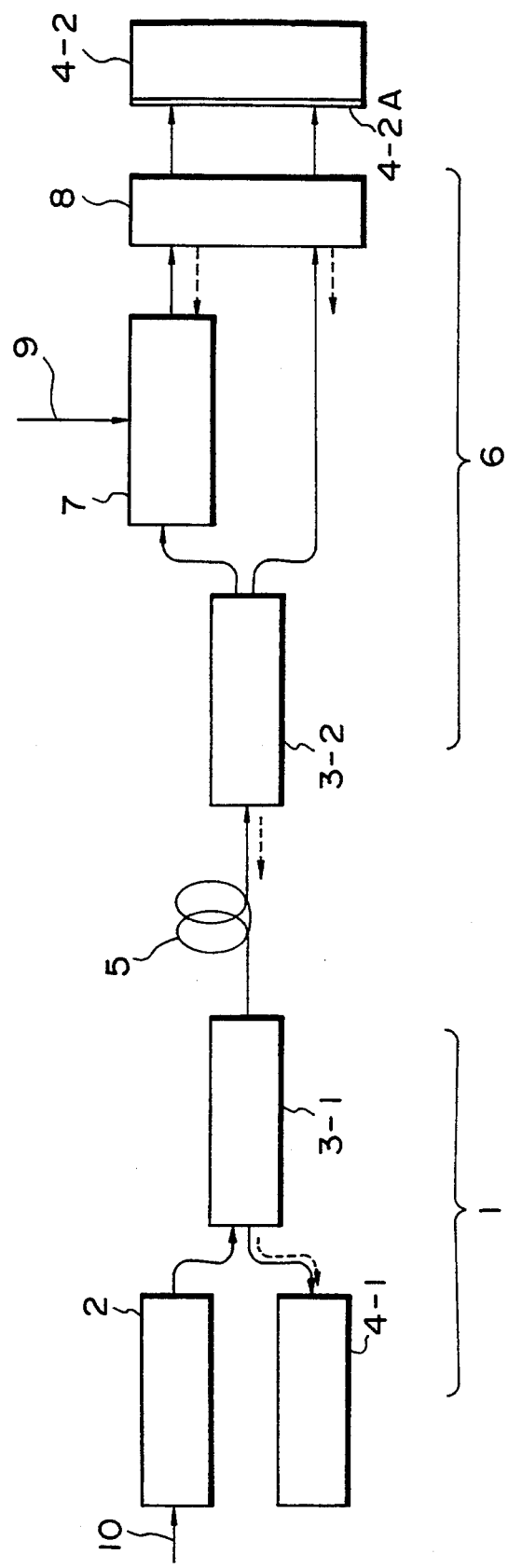
FIG. 3 is a block diagram of basic construction of a bidirectional light transmission system according to the present invention.

FIG. 3 is a block diagram of the basic construction of a bidirectional light transmission system according to the present invention.

In this figure, a transmitting station 1 is composed of a light source 2, a light branching portion 3-1 for branching intensity-modulated light from the light source at a predetermined ratio, and a light receiving portion 4-1. A receiving station 6 is connected to a single optical fiber transmission line 5 being shared with the transmitting station 1 and receives light transmitted from the light source. The receiving station 6 is composed of a light branching portion 3-2, a phase modulating unit 7, a light reflecting portion 8 and a light receiving portion 4-2 having a light receiving surface 4-2A. Transmitted light is branched into two parts at a time by the light branching portion 3-2, at least one of the two branched light beams is phase-modulated by the phase modulating unit 7 and the two branched light beams enter the light receiving portion 4-2 via the light reflecting portion 8 at a time. On the other hand, the two branched light beams partially reflected by the light reflecting portion 8 are returned through two light transmission lines having approximately the same branch length to the light branching portion 3-2, in which the returned light is intensity-modulated and returned to the light transmission line 5.

On a basis of the basic construction shown in FIG. 3, referring to FIGS. 4A to 4E, various embodiments including changes and modifications derived from the basic construction will be explained below sequentially.

Embodiment 1

FIG. 4A shows Embodiment 1 of the bidirectional light transmission system according to the present invention. Embodiment 1 comprises a laser 16, a beam splitter 17, an LiNbO3 phase modulator 7 and half mirrors 18 and 18A, as a light source, a light branching portion, a light modulating unit and a light reflector respectively. In this case, since Mach-Zehnder interference refractometer is composed of the beam splitter 17, the phase modulator 7 and the half mirror 18 for reflected light, the reflected light is intensity-modulated and then returned to the transmitting station. To the contrary, the light transmitted from the half mirror 18A is directly incident in the light receiver 4-2. As a result, the transmitted light is not intensity-modulated, i.e., a signal transmitted from the transmitting station is received by the light receiver 4-2 having a light receiving surface 4-2A without being disturbed by the phase modulator 7.

Embodiment 2

FIG. 4B shows Embodiment 2 of a bidirectional light transmission system according to the present invention. Embodiment 2 is composed of a semiconductor laser 31 as a light source, a photocoupler 19 with a branching ratio of m:n as a light branching portion, a 3 dB photocoupler 19A as a light branching portion in the receiving station, a phase modulator 7, a light reflector 20 of reflection factor R (R<1) and a photodiode (PD) 4-2 such as a pin PD. In this case, a balance bridge type light intensity modulator is formed for reflected light.

Embodiments 3 and 4

FIGS. 4C and 4D show more practical embodiments of the bidirectional light transmission system according to the present invention. An optical integrated circuit 32 is used in which a light branching portion, a phase modulating unit, a light reflecting portion and a light receiving portion in a receiving station are integrated on glass or a crystal substrate made of semiconductors, ferroelectric materials or the like. Reference numeral 5A is a single mode optical fiber. Embodiment 3 shown in FIG. 4C is a Mach-Zehnder interference type light intensity modulator and Embodiment 4 shown in FIG. 4D is a directional coupling light intensity modulator for reflected light.

Embodiment 5

Figure 4E:
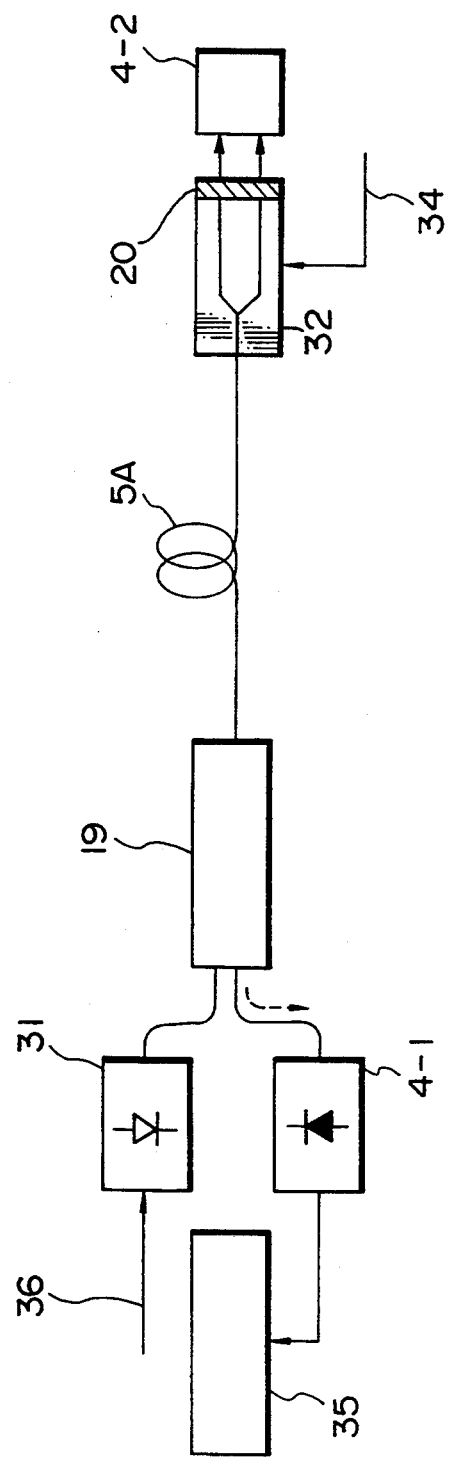

FIG. 4E shows a practical example of a bidirectional light transmission system according to the present invention. In the example, a transmitting station is provided with a signal selector 35, an FM multiple signal 36 of an analog or a digital signal of video or the like is transmitted from the transmitting station in a high frequency band, and a demand access signal 34 for selecting a video signal is returned from a receiving station to the transmitting station in a low frequency band so that the demand access signal does not overlap the transmitted signal from the transmitting station.

According to the present invention, since a light source is unnecessary at the receiving station, the construction can be simplified. Since modulation in the receiving station is phase modulation, a signal transmitted from the transmitting station can be received without being disturbed. In general, since a light modulating unit is a non-linear device, the modulation has an influence of non-linear distortion on a signal. Even though a transmission signal modulated in a high frequency band is modulated with a low frequency for protecting a signal from disturbance, a high frequency component may be added to the transmitted signal due to the modulation distortion, and specifically modulation distortion has a great influence on an analog signal. Since the light transmission system of the present invention has no influence on a transmission signal, the system is effective to an analog signal to be easily affected by non-linear distortion or the like. For example, the system of the present invention is effective to bidirectional light transmission, in which an analog signal such as a video signal is transmitted from a transmitting station and the demand access signal (digital signal) for selecting the video signal is transmitted from a receiving station.

In the transmission system of the present invention, since two branched light beams are received at a time, optical loss of 3 dB caused by a light branching portion does not exist and optical loss is only caused by a light reflector. Consequently, a depression of a level of received light is very small. Moreover, the loss caused by a light reflector can be effectively used as a return signal. The reflected light can be intensity-modulated by a light intensity modulator (Mach-Zehnder interference type light intensity modulator or a directional coupling type light intensity modulator) which is composed of an optical modulator and a light branching portion. Moreover, since an amount of reflected light can be changed by just adjusting a reflection factor of a light reflector, the light transmission system of the present invention is very effective to its designing.

Moreover, since reflected light returned to a transmitting station are not always returned and can be returned if necessary in the system of the present invention, operation characteristics of the bidirectional light transmission system can be improved. A semiconductor laser is disturbed by reflected light, and hence operation characteristics are deteriorated due to an increase in noises, output variations or the like. As a result, it is very important that reflected light is not returned to a light source. In the system of the present invention, reflected light is not returned to the light source.

An optical modulator of the present invention will be explained. First, an operation principle of the optical modulator will be explained.

Figure 5A:
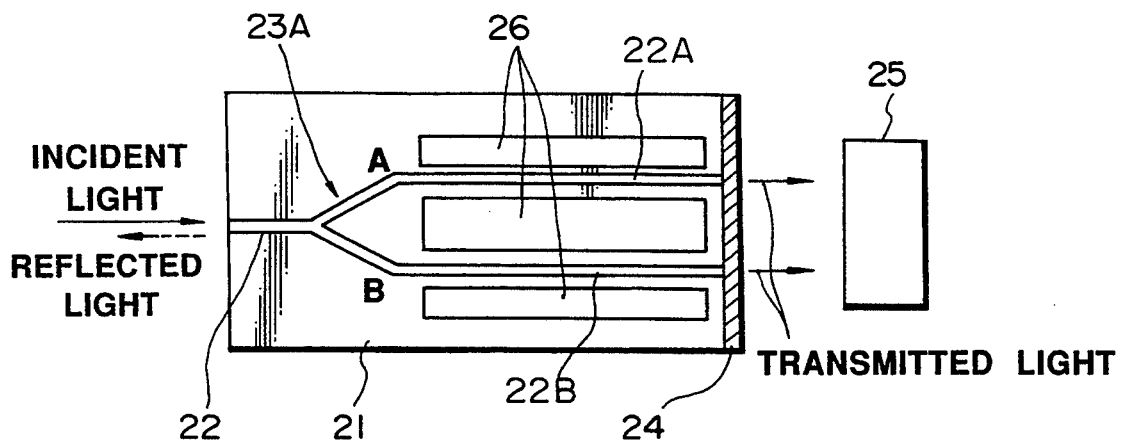
FIGS. 5A and 5B are plan views illustrating basic construction of an optical modulator according to the present invention, respectively.
Figure 5B:
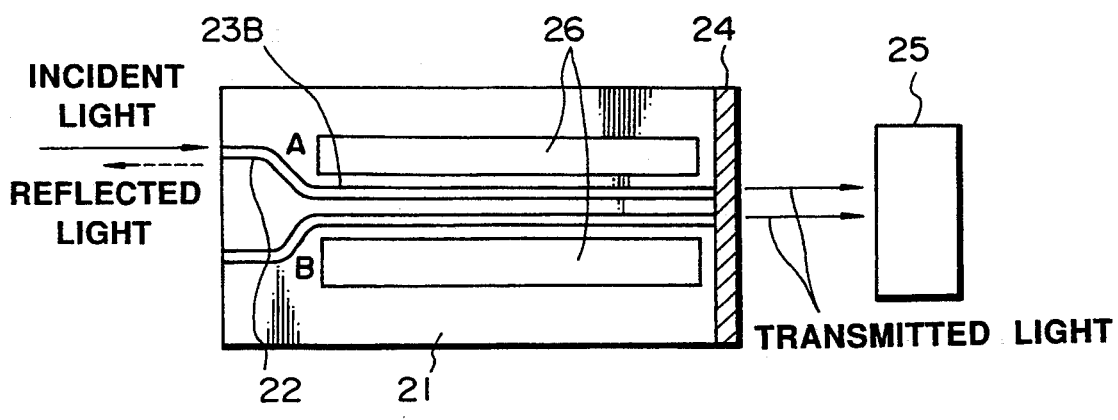

FIGS. 5A and 5B show the basic constructions of the optical modulator. Incident light is introduced to a single mode optical waveguide 22 formed on a crystal substrate 21, is branched into two branched light beams by a Y shape branched waveguide 23A or a directional coupling waveguide 23B, and the two branched light beams are introduced into a branched waveguide A and a branched waveguide B. FIG. 5A shows an optical modulator using a Y shape branched waveguide 23A, and FIG. 5B shows an optical modulator using a directional coupling waveguide 23B. Referring to FIG. 5A, an operation principle will be described in detail. Each branched light is phase-shifted by an electric field applied to parallel optical waveguides 22A and 22B by electrodes 26. After phase-shifted, part of each branched light is reflected by a light reflecting portion 24 provided at an output edge surface of a crystal substrate and passes through the electric field applied parallel optical waveguides, and is phase-shifted again and reaches the Y shape branched waveguide 23A. The two branched light beams interfere with each other at the Y shape branched waveguide. If the two branched light beams overlap at the same phase, they are introduced into a single mode optical waveguide. If the two branched light beams overlap at an opposite phase, they are radiated out of the optical waveguide in a radiation mode. Consequently, intensity of the reflected light is intensity-modulated according to a phase modulating electric field.

On the other hand, part of the each branched light is not reflected by a light reflecting surface but transmitted, converged on a light receiver 25 and is fetched as an electric signal. The two branched light beams are phase-modulated, but the light receiver 25 can simultaneously receive the two branched light beams without uniting or mode coupling the two branched light beams. The received light signal is not affected by a modulation signal in a phase modulating portion at all. An operation principle of the directional coupling type optical modulator shown in FIG. 5B is the same.

Embodiment 6

Figure 6A:
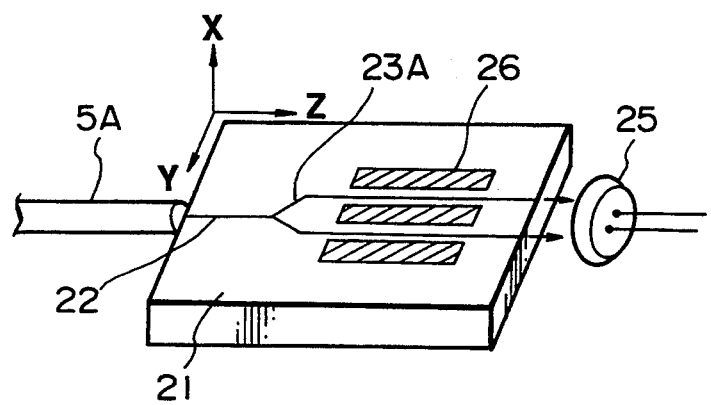
FIGS. 6A to 6C are perspective views illustrating an embodiment of the optical modulator according to the present invention respectively.

FIG. 6A shows an embodiment of an optical modulator in which a crystal substrate is made of $LiNbO_3$ and light is transmitted in the Z axis direction of an X-cut $LiNbO_3$ crystal substrate 21 and an electric field is applied in the Y axis direction thereof. As shown in FIG. 6A, the construction of the optical modulator is very simple, in which a single mode optical fiber 5A is connected to an incident side of the substrate and a light receiver 25 is directly connected to an output side of the substrate, and an optical waveguide is composed of a Y shape branched waveguide 23A.

The $LiNbO_3$ substrate having aforementioned crystal orientation has the same electrooptic coefficient r22 (signs are opposite to each other) for TE mode light and TM mode light. Consequently, the optical modulator is independent of polarization of light and can be directly connected to the single mode optical fiber 5A. In this case, analog modulation can be also made. Since the $LiNbO_3$ crystal substrate 21 has a high refractive index (2.22), about 14 percent of light are reflected even if a reflector is not used. The remaining 86 percent of the light are transmitted and directly incident in the light receiver 25.

Embodiment 7

Figure 6B:
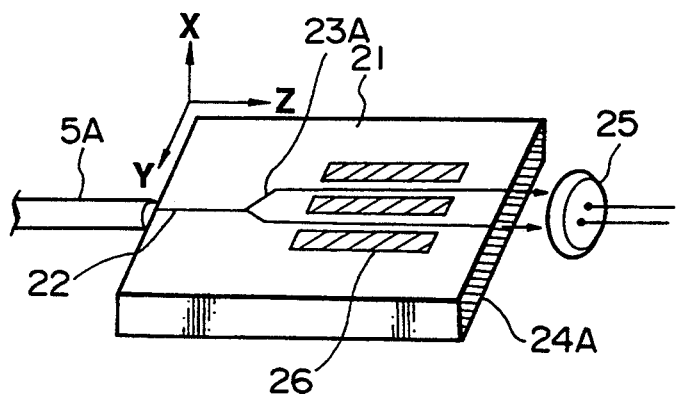

In an optical modulator shown in FIG. 6B, an output edge surface of the $LiNbO_3$ crystal substrate 21 is coated with a reflecting film 24A (reflecting factor<1) and an amount of reflected light can be set freely.

Embodiment 8

Figure 6C:
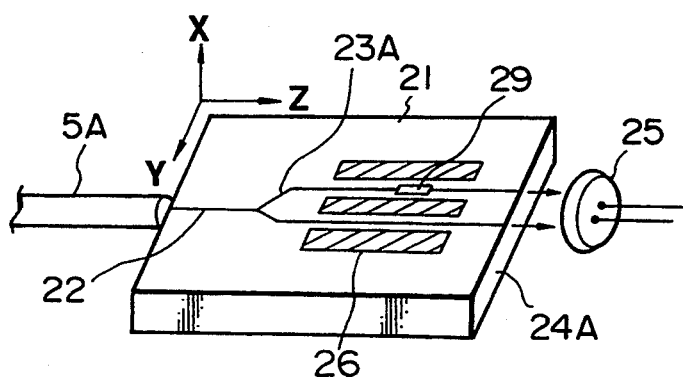

FIG. 6C shows an optical modulator having a cladding layer 29 at a part of its Y shape branched waveguide. Since electrooptic coefficients have opposite signs to each other for TE mode light and TM mode light in the aforementioned crystal orientation, where the branch lengths of the optical waveguide are different a static phase difference is generated and a modulation factor is decreased. However, the decrease in the modulation factor can be compensated by mounting the cladding layer 29.

Embodiment 9

Figure 6D:
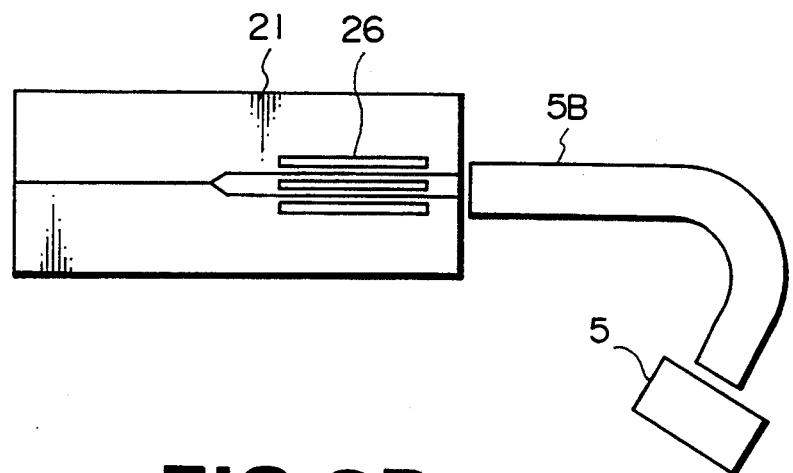
FIGS. 6D and 6E are plan views illustrating other an embodiment of the optical modulator, respectively.

FIG. 6D shows an optical modulator in which a multi-mode optical fiber 5B is provided at an output edge surface and output light is introduced into a light receiver 25.

Embodiment 10

Figure 6E:
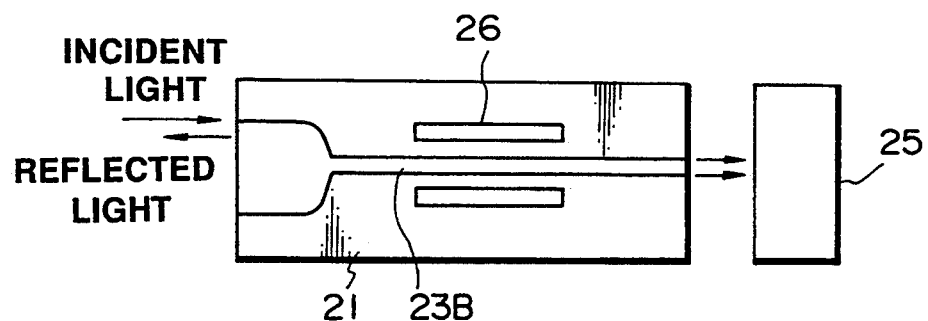

FIG. 6E shows another embodiment of an optical modulator according to the present invention. Embodiment 10 is an optical modulator in which parallel optical waveguides (directional coupling type optical waveguide 23B) are formed.

Embodiment 11

Figure 6F:
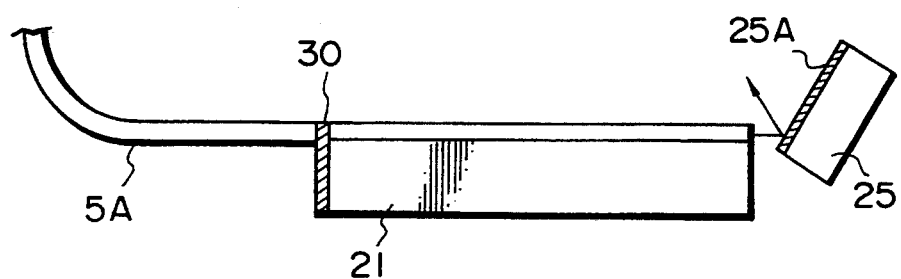
FIG. 6F is a cross sectional view illustrating further another embodiment of the optical modulator.

FIG. 6F shows further another embodiment of an optical modulator according to the present invention. Anti-reflection coating 30 is made on an incident edge surface of a crystal substrate 21, to which a single mode optical fiber 5A is attached. Anti-reflection coating is made on a light receiving surface 25A of a light receiver 25, or the light receiving surface 25A is obliquely attached to a crystal edge surface so that reflected light from the light receiving surface 25A is not returned to an optical waveguide. An influence of multi-reflection in the crystal or between the light receiving surface and the crystal edge surface can be eliminated by anti-reflection coating. Moreover, optical coupling efficiency of an optical waveguide and an optical fiber at an incident edge surface can be also improved.

Materials other than $LiNbO_3$ such as $LiTaO_3$ and semiconductor, for example, GaAs or the like are usable for substrate materials of the above optical modulator. The optical modulator of the present invention has a light reflecting portion on which part of light is reflected, and hence a light source for a return signal is not necessary and one light source can be effectively used for both a transmitting station and a receiving station.

Since two phase-modulated branched light beams are received at a time by using the optical modulator of the present invention, an intensity-modulated transmitted signal being superimposed with incident light can be received without being disturbed by the optical modulator. Moreover, reflected light can be effectively used as a returned signal because loss of 3 dB by a Y shape light branching portion is not brought to the reflected light. Since the optical modulator becomes a reflective intensity modulator for a return signal, a half wavelength voltage can be made small.

Moreover, since a light modulating unit can be also independent of polarization of light, the optical modulator of the present invention can be placed far away from a light source, i.e., by using a single mode optical fiber. Economical bidirectional light transmission using a single mode optical fiber can be made. The device of the present invention is a device in which an optical modulator, a light branching portion, a light source, a light receiver and the like are effectively integrated. The device has such many advantages that one light source is effectively available for a transmitting station and a receiving station, that loss of 3 dB, which is essentially generated in a light branching portion, is not brought to reflected light and that a transmitted signal from a transmitting station is not disturbed because only a part of light is reflected.

An optical modulator independent of polarization of light is formed on a so-called Z axis propagation LiNbO₃ crystal substrate, wherein light is propagated in the Z axis direction of the crystal and an electric field is applied in the Y axis direction thereof. In this optical modulator, a single mode optical waveguide can be formed, which is hardly damaged by light, has no Li₂O external diffusion when Ti is diffused and does not easily depend on polarization of light. Additionally, each output from the asymmetrical branched waveguide can be changed consecutively by an applied electric field or analog light can be modulated.

Optical devices will be described which can enables a switching operation.

The optical device of the present invention is provided with an asymmetrical Y shape branched waveguide (the respective effective refractive indexes of two Y branched optical waveguides differ from each other) and a branch interference type light modulating unit. An effective refractive index control unit independent of an applied electric field is provided on at least one of the two optical waveguides constituting the light modulating unit and a light reflecting portion and a light receiving portion are provided on one side of an incident side and an output side.

Figure 7:
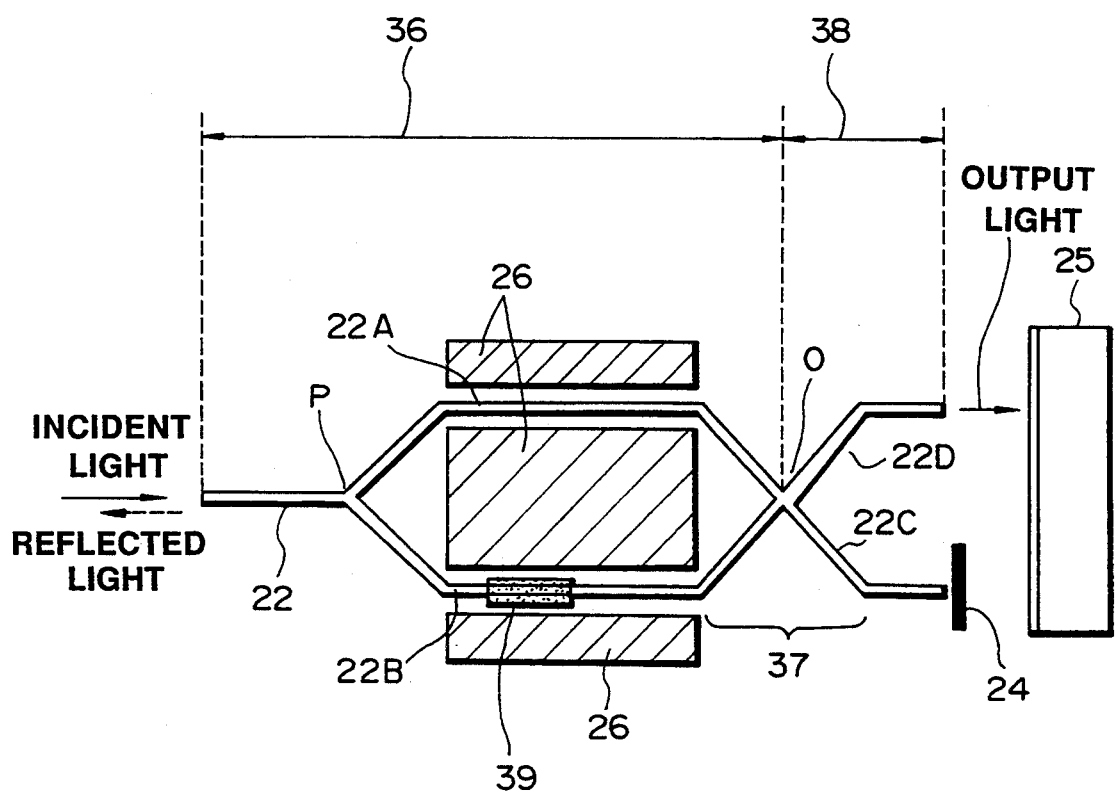
FIGS. 7 and 8 are plan views illustrating basic construction of an optical device according to the present invention, respectively.

FIG. 7 is a view illustrating an example of a structure of the present invention. An optical waveguide 22 branches at a point P. Electrodes 26 are provided on either outer side of parallel portions of the branched optical waveguides 22A and 22B and on a center portions thereof. The branched optical waveguides 22A and 22B cross each other at a point O. and branched optical waveguides 22C and 22D extend from the branched optical waveguides 22A and 22B. The distance between the waveguide 22A and the waveguide 22B is large and no optical directional coupler is formed, but a branch interference type light modulating unit is formed in an area between an incident side of the optical waveguide 22 and the point O. The effective refractive index of the branched optical waveguide 22C differs from that of the branched optical waveguide 22D, and an asymmetrical X shape branched optical waveguide 37 is formed on either side (right and left sides) of the point O and an asymmetrical Y shape branched waveguide 38 is formed on an output side of the optical waveguide 22. In this example, the effective refractive indexes of the optical waveguides 22A and 22B differ from each other due to the difference between the widths thereof, however, the method of forming an asymmetrical Y shape branched waveguide is not limited thereto. A light reflecting portion 24 and a light receiving portion 25 are provided on the output edges of the branched optical waveguides 22C and 22D respectively and an effective refractive index control unit 39 is provided in the branched optical waveguide 22B. The effective refractive index control unit 39 will be described in more detail later. The light reflecting portion 24 and the light receiving portion 25 can be also provided on the output edges of the branched optical waveguides 22D and 22C respectively in reverse and the effective refractive index control unit 39 can be also provided on the branched optical waveguide 22A or on both of the waveguides 22A and 22B.

Figure 8:
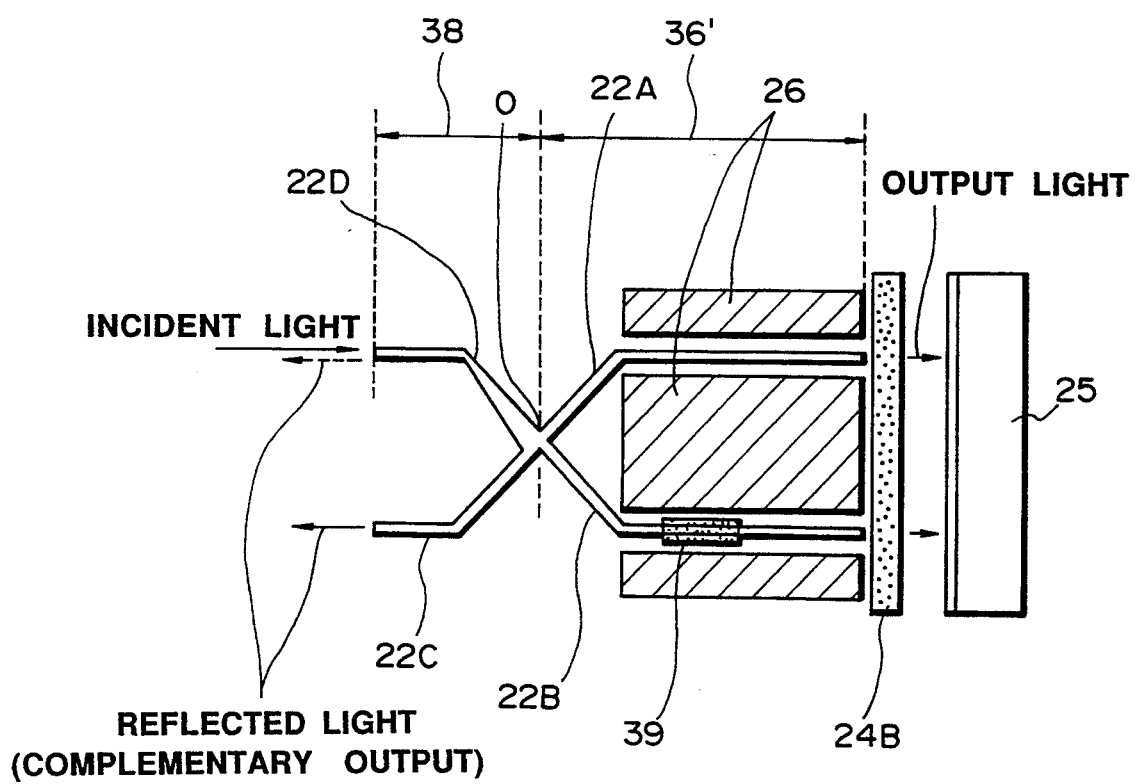

FIG. 8 illustrates another construction example of the present invention, the asymmetrical Y shape branched waveguide 38 is provided on an incident side and a reflecting branch interference type light modulating unit 36' is provided on an output side, and a light reflecting portion 24B is provided on either output edge of the branched optical waveguides 22A and 22B. One part of incident light is transmitted to the light receiving portion 25 through the light reflecting portion 24B and the other part thereof is reflected to the branched optical waveguides 22C and 22D.

The conventional optical device construction does not include the effective refractive index control unit and controls a phase of light by using only the electrooptic effect. The construction of an optical directional coupler is necessary for an optical switch independent of polarization of light. In the optical device of the present invention, an optical switching operation can become independent of polarization of light by changing at least one effective refractive index of two optical waveguides by the effective refractive index control unit. Moreover, since a light reflecting portion and a light receiving portion are provided, light transmission and reception can be achieved without a light source for a transmitting in the receiving station.

In the construction shown in FIG. 7, light is branched into two asymmetrical Y shape branched waveguides by a switching operation. In this case, when the light is introduced into the waveguide with a light reflecting portion provided, the light is reflected by the light reflecting portion and returned to an incident edge through the same waveguide. On the other hand, when the light is introduced into the waveguide without a light reflecting portion provided, it is not reflected but received by a light receiving portion. Consequently, a light signal with response to a switching operation is received into the light receiving portion 25, while a returned light is intensity-modulated by the switching operation and is used as a transmission signal. In this case, when the light is not modulated, all the light is received by the light receiving portion, so the signal-to-noise ratio is improved. Moreover, since the light receiving portion can be directly connected to a single mode optical waveguide so as to make a light receiving area small, reception of wide band signals (over 2 GHz) is allowed. An amount of reflected light can be changed by a reflection factor of materials used for the light reflecting portion, but can be also changed by a driving voltage in the optical device according to the present invention.

In the construction shown in FIG. 8, since reflected light reflected on a light reflecting portion 24B are branched and pass through two optical paths of an asymmetrical Y shape branched optical waveguide by a switching operation, the reflected light can be used as a transmission light signal. In this case, since the outputs into optical waveguides 2C and 2D are complementary outputs (one output light is turned on, while the other output light is turned off.), the device of the present invention can be subsidiarily connected so as to transmit and/or receive signals. Thus, the device of the present invention is applicable to optical LAN, optical CATV and the like. On the other hand, output light outputted to the light receiving portion 25 is independent of a switching operation and are directly received as signal light.

Next, the switching operation principle of the device independent of polarization of light will be described in more detail.

Operation Principle

An asymmetrical Y shape branched optical waveguide is used for branching basic mode light and primary mode light generated at an X crossing point O into a wide optical waveguide and a narrow optical waveguide. A branching interference type light modulating unit interferes the branched two light waves each other at the crossing point O so as to generate the basic mode light and the primary mode light. Moreover, an effective refractive index control unit gives TE mode light and TM mode light a constant phase difference. An optical switching operation independent of polarization of light can be achieved by controlling the phase difference to a suitable value. A phase shift $\theta E$ of the TE mode light and a phase shift $\theta M$ of the TM mode light in the effective index control unit at a voltage application time are commonly expressed by the following formulae:

$$\theta E = a + \alpha V$$

$$\theta M = b + \beta V$$

where a and b are phase shifts of the TE mode light and the TM mode light respectively by the effective refractive index control unit, the second terms on the right sides are phase shifts which are induced in the TE mode light and the TM mode light due to the electrooptic effect when a voltage (V) is applied, and $\alpha$ and $\beta$ are proportional constants based on the electrooptic coefficient. Light outputs P0 and P0' of one branched optical waveguide and the other branched optical waveguide constituting the optical device of the present invention are expressed by the following formulae:

$$P0 = Pi \sin^2(\theta/2)$$

$$P0' = Pi \cos^2(\theta/2)$$

where Pi is intensity of incident light and $\theta = \theta E$ or $\theta M$. Consequently, the characteristic curve of the output light versus the applied voltage of the device depends on the phase shifts a and b caused by the effective refractive index control unit.

Taking the construction shown in FIG. 7 as an example, light is transmitted along the X axis of the LiNbO₃ crystal substrate and an electric field is applied in the Z axis direction, and an operation of the device of the present invention will be described below.

In this case, the ratio of $\alpha$ to $\beta$ is given by the following:

$$\alpha:\beta = n_e^3 r_{33} : n_o^3 r_{13} \sim 2.9 : 1,$$

where $n_e$ and $n_o$ are an ordinary refractive index and an extraordinary index, r33 and r13 are electrooptic coefficients (Pockels constant).

Figure 9A:
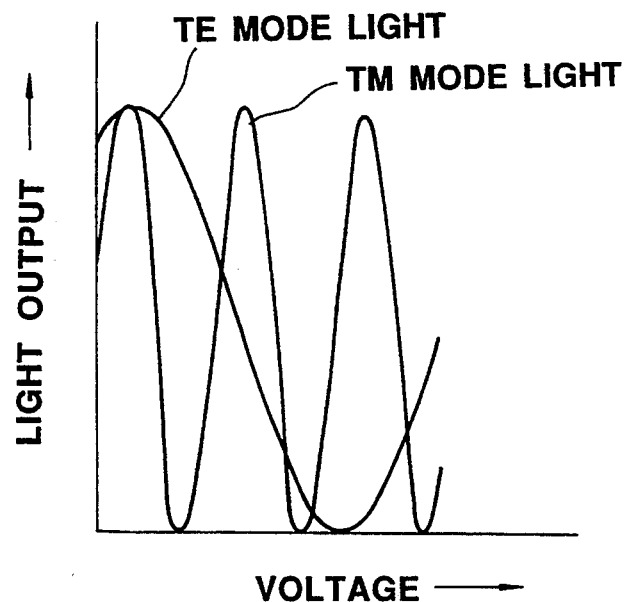
FIGS. 9A and 9B are diagrams showing an example of characteristics of a light output versus an applied voltage of the optical device according to the present invention, respectively.
Figure 9B:
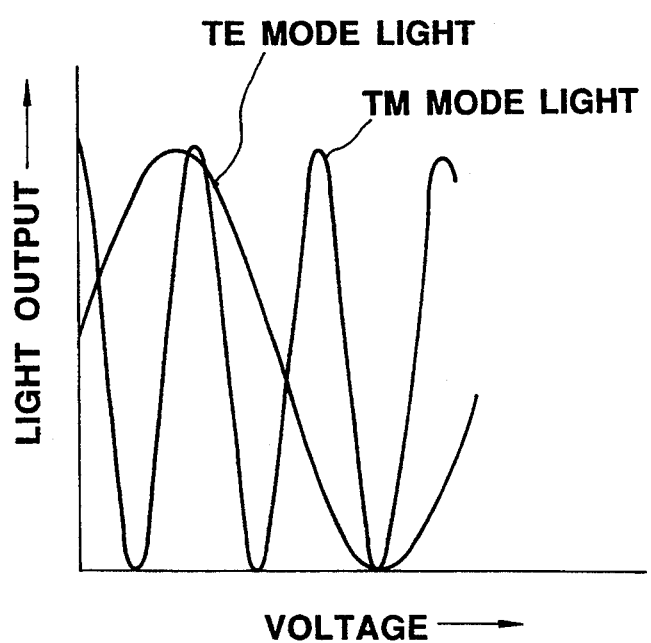

Consequently, the characteristic curve of the output light versus the applied voltage for the TE mode light and the TM mode light is generally shown in FIG. 9A.

Figure 10A:
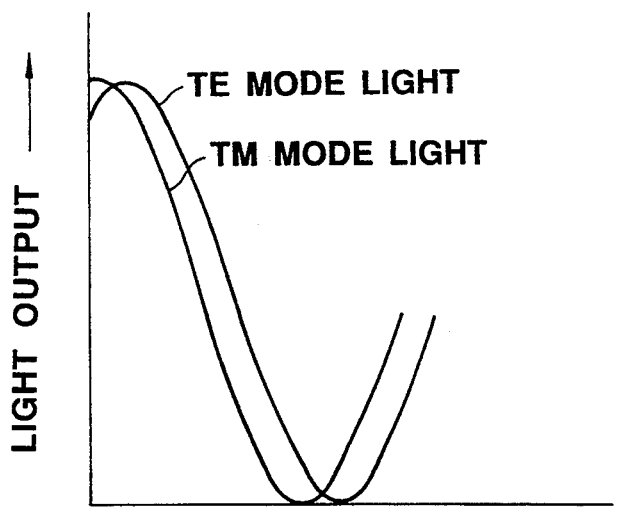
FIGS. 10A and 10B are diagrams showing an example of characteristics of a light output versus an applied voltage of the optical device according to the present invention, respectively.
Figure 10B:
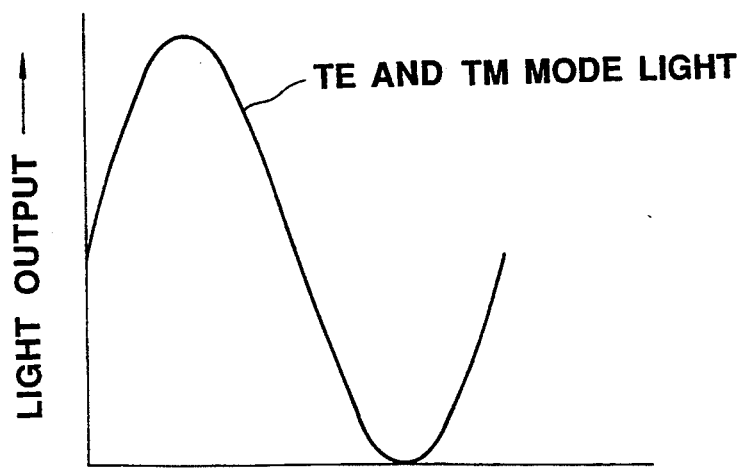

$\alpha$ and $\beta$ have a relationship of an integer ratio. Consequently, an optical switching operation can be independent of polarization of light by controlling a and b so that the smallest point of intensity of the TM mode light accords with the smallest point of intensity of the TM mode light by the appropriately formed effective refractive index control unit. In the construction shown in FIG. 7, a device, in which light is transmitted along the Z axis direction of the LiNbO₃ crystal and an electric field is applied in the Y axis direction thereof, has proportional constants $\alpha$ and $\beta$ having electrooptic coefficients whose magnitudes are the same and whose signs are opposite to each other. Thus, $\beta = -\alpha$ is satisfied and the period of the TE mode light accords with the period of the TM mode light as shown in FIG. 10A. When the effective refractive index control unit is formed so that the phase difference, which satisfies $a+b=2N\pi$ (N is an integer), is given as shown in FIG. 10B, an optical switching operation can be independent of polarization of light. The optical device has characteristics that each output from the asymmetrical Y shape branched waveguide can be consecutively taken out by applying a voltage to the device.

Specifically, the structures of the effective refractive index control unit for providing the above phase difference are, for example, as follows:

(1) Lengths of two branched optical waveguides constituting a branching interference type light modulation unit differ from each other.

(2) The refractive indexes of the two branched optical waveguides constituting the branching interference type light modulation unit differ along all the lengths or part of the lengths.

(3) Widths of the two branched optical waveguides constituting the branching interference type light modulating unit differ from each other along all the length or part of the length thereof.

(4) Effective refractive indexes of the two branched optical waveguides differ from each other by mounting transparent insulating materials whose refractive index is smaller than that of the optical waveguides on part of at least one of the two branched optical waveguides constituting the branching interference type light modulating unit.

Additionally, the above structures can be combined. When LiNbO₃ or LiTaO₃ is used as a substrate, the refractive index is generally controlled by an amount of Ti diffused into an optical waveguide. At least one of the refractive index and the width of the optical waveguide can be controlled by changing at least one of the thickness and the width of a Ti film for forming the optical waveguide.

An appropriate amount of a phase shift for the TE or the TM mode light is generally given by the structures (1) to (3). A large phase shift can be given particularly to the TM mode light by the structure (4). Specifically, the combination of the above structures (1) to (4) can realize a zero-bias optical switching operation independent of polarization. For example, in the construction shown in FIG. 7, the device, in which light is transmitted in the Z axis direction of the LiNbO₃ crystal and an electric field is applied in the Y axis direction thereof, can be obtained by appropriately forming the effective refractive index control unit so that two requirements, i.e., $a+b=\pm 2N\pi$ and $a=\pi 2 \pm 2M\pi$ (M is an integer) are satisfied.

Moreover, an asymmetrical Y shape branched waveguide can be also constituted as well as the above construction of the effective refractive index control unit.

Experiment Examples

An optical switch of the present invention formed on a so-called Z axis transmission LiNbO₃ device will be described. In the construction of the device shown in FIG. 11, an LiNbO₃ crystal is used for substrate materials of the device, and light is transmitted in the Z axis direction and an electric field is applied in the Y axis direction.

Figure 11:
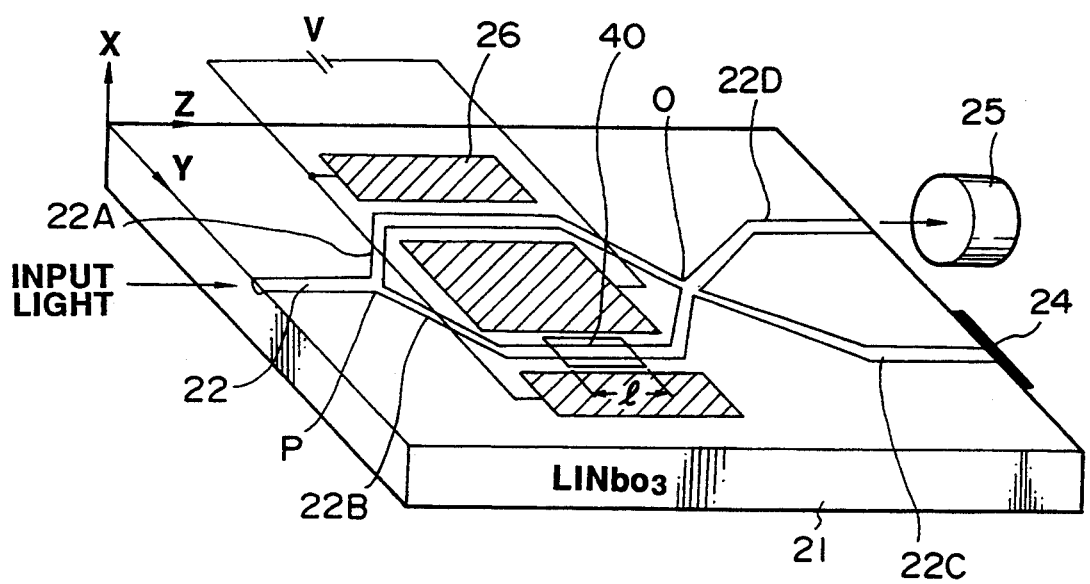
FIG. 11 is a perspective view illustrating an embodiment of the optical device according to the present invention.

As shown in FIG. 11, an optical waveguide 22 formed on an LiNbO₃ crystal substrate 21 is branched into two optical waveguides 22A and 22B at a point P to form a branching interference type light modulating unit. The two optical waveguides 22A and 22B cross each other at a point O to form an asymmetrical Y shape branched waveguide. An edge portion of the waveguide 22C is provided with a light reflecting portion 24 and an edge portion of the waveguide 22D is provided with a light receiving portion 25. Electrodes 26 are provided on each outer side of the branched optical waveguides 22A and 22B of the light modulating unit and on a middle portion thereof and a cladding layer 40 is provided as an effective refractive index control unit. The transparent cladding layer 40 corresponds to the above structure (4) of forming the above effective refractive index control unit, and is fabricated by first coating a photo resist (refractive index n=1.61) and then heating and fixing it.

Figure 12:
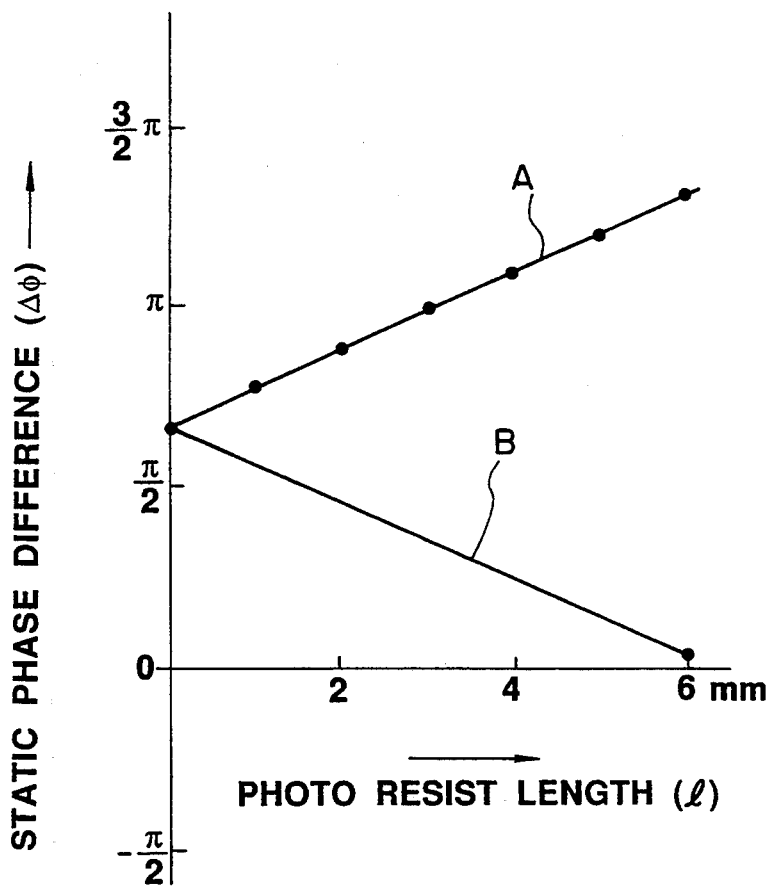
FIG. 12 is a graph showing characteristics of a photo resist length versus a static phase difference in the embodiment of FIG. 11.
Figure 13B:
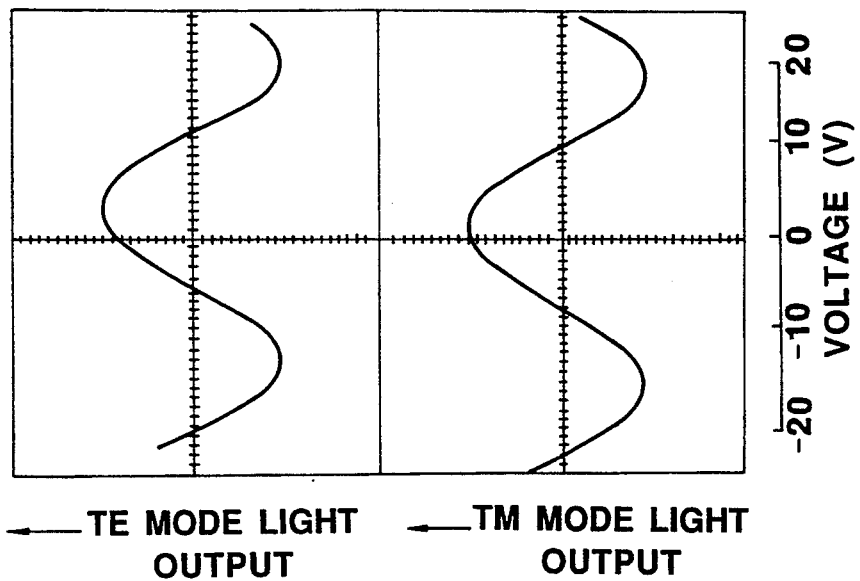
FIGS. 13A and 13B are graphs showing characteristics of a light output versus an applied voltage in an optical switch independent of polarization of light.
Figure 13A:
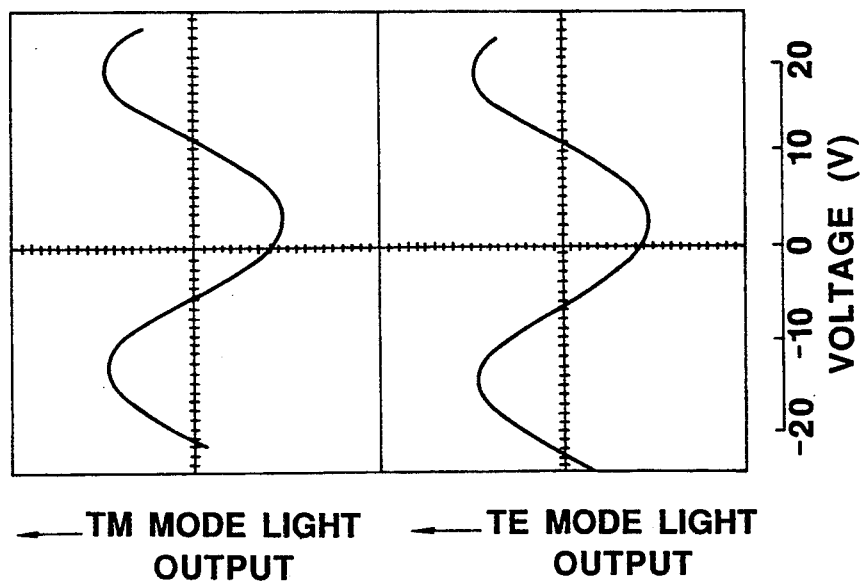

FIG. 12 is a diagram showing a relationship of a photo resist length 1 and a static phase difference ($\Delta\phi$=a+b) between the TE mode light and the TM mode light received by the light receiving portion 25. Line A indicates characteristics when the photo resist is mounted on the lower optical waveguide 22B of the two optical waveguides constituting the branching interference light modulating unit, and line B indicates characteristics when the photo resist is mounted on the upper optical waveguide 22A. The two lines are approximately linear. Even though the photo resist is not mounted, a static phase difference (about 0.7 $\pi$) exists. This is caused by a difference in lengths between the two optical waveguides 22A and 22B constituting the branching interference type light modulating unit, and this corresponds to the construction by the above structure (1). In any case, an optical switch independent of polarization of light can be formed by suitably determining the length of the photo resist. When the phase difference $\Delta\phi$=0 or 1=6 mm (in FIG. 11, a photo resist with length of 6 mm is provided on the upper optical waveguide 22A of the branched two optical waveguides), an optical switching operation independent of polarization of light can be achieved. In FIGS. 13A and 13B, characteristics of a light output versus an applied voltage of the optical waveguides 22C and 22D for the TE mode light and the TM mode light when 1=6 mm, are illustrated respectively. The similar characteristics are shown for the TE mode light and TM mode light. It is clear that the device operates as an optical switch independent of polarization of light and that a half wavelength voltage is as low as 16 V. As seen above, in the construction of the Z axis propagation device, an optical switching operation, in which a device is driven at a low voltage and is independent of polarization of light, can be easily achieved.

In FIG. 11, even if LiTaO$_3$ is used as a substrate instead of LiNbO$_3$, the same effect can be obtained.

Embodiment 12

Figure 14:
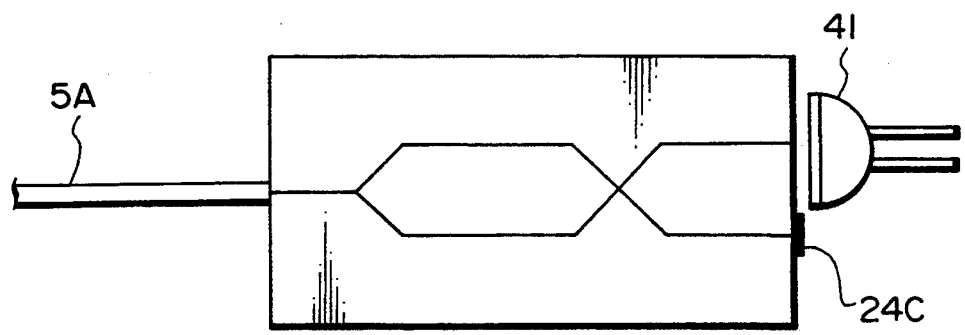
FIGS. 14 to 16 are plan views of an embodiment of an optical device according to the present invention, respectively.

FIG. 14 illustrates an embodiment of an optical device according to the present invention. This embodiment is an optical device corresponding to the construction shown in FIGS. 7 and 11. Electrodes and an effective refractive index control unit for performing a switching operation are omitted in the figure, and have been already described above. Additionally, electrodes and an effective refractive index control unit are also omitted in the later embodiment s.

In this embodiment, a single mode optical fiber 5A is connected to an incident edge of the optical device and a photodiode 41 such as a pin PD (photodiode) and an APD (avalanche diode) is connected to one output edge of the asymmetrical Y type branched waveguide and a total reflecting film 24C formed of an aluminum evaporation film is connected to the other output edge thereof. Thus, as described above, a signal according to a switching operation caused by applying a voltage to an electrode not shown, is output to the photodiode 41, while intensity-modulated light can be fetched from the incident edge.

Embodiment 13

Figure 15:
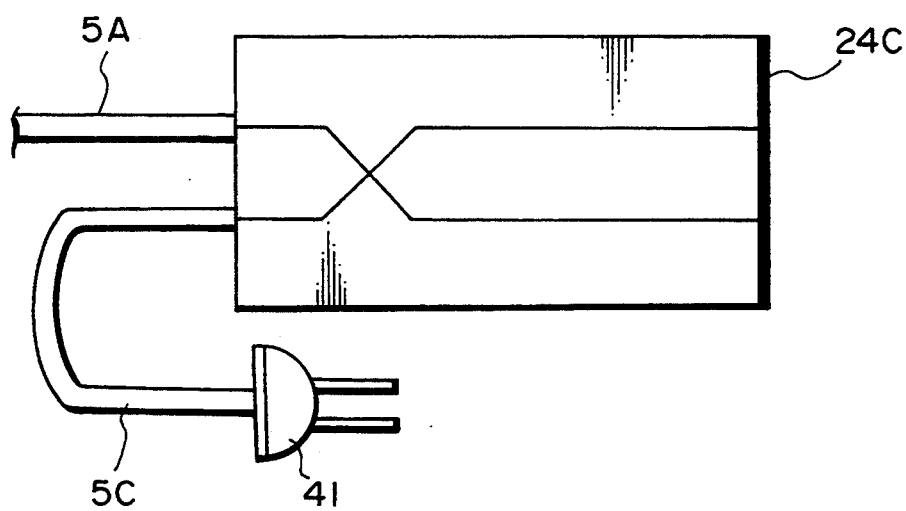

FIG. 15 illustrates another embodiment of an optical device according to the present invention. In this embodiment, an asymmetrical Y shape branched optical waveguide is formed on an incident side and a reflective branching interference type optical modulator is formed between a total reflecting film 24C and the Y shape branched optical waveguide. As described in FIG. 8, complimentary outputs, one of which is turned on and the other of which is turned off, are outputted to an incident single mode optical fiber 5A and an output single mode or multimode optical fiber 5C respectively. A light modulating unit is a reflective branching interference type light modulating unit, and hence a driving voltage can be made to be decreased markedly.

In this embodiment, since a distance between the two asymmetrical Y shape branched waveguides is equal to or less than 100 $\mu$m, output light is introduced to a photodiode 41 by using a single mode or a multimode optical fiber 5C.

Embodiment 14

Figure 16:
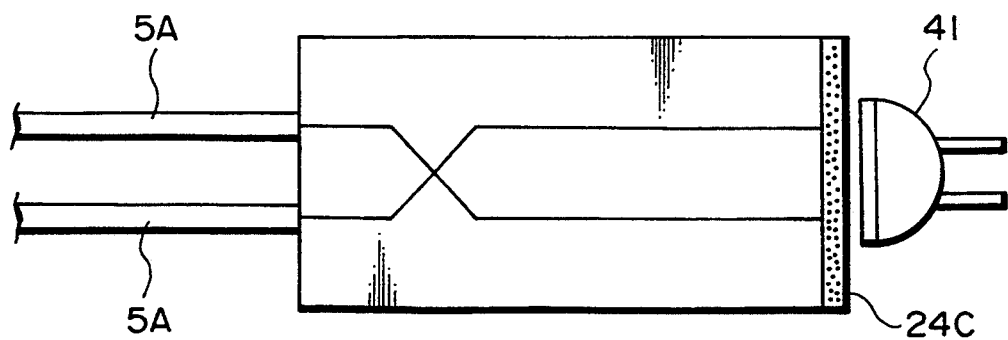

FIG. 16 illustrates further another embodiment according to the present invention. The embodiment corresponds to the construction shown in FIG. 8, a thin aluminum evaporation film 24C or an edge surface of a crystal substrate itself is used as a reflecting surface. One part of incident light is reflected and the other part of incident light is transmitted by the reflecting surface and introduced into a photodiode 41 provided just after a reflecting film 24C. A single mode optical fiber 5A is provided at an incident edge of an asymmetrical Y shape branched waveguide. An operation of the embodiment has been explained in FIG. 8.

As described above, the optical device of the present invention has the following effects:

(1) Since an asymmetrical Y shape optical waveguide is used rather than an optical directional coupler so as to obtain a method of achieving a switching function, restrictions on manufacturing requirements and accuracy are not severe. Consequently, designing and fabrication of the device are easy. Moreover, the device of the present invention can operate at a low driving voltage.

(2) An optical switching operation independent of polarization of light can be performed by merely providing an effective refractive index control unit, and hence the construction of the device can be simplified.

(3) The device of the present invention is formed on a so-called Z axis transmission LiNbO$_3$ crystal substrate, in which light is transmitted in the Z axis direction of the LiNbO$_3$ crystal and an electric field is applied in the Y axis direction thereof. The device is hardly damaged by light and has little external diffusion of Li$_2$O at a Ti diffusion time, and can easily form a single mode optical waveguide. Additionally, since the device can consecutively change each output from an asymmetrical branched waveguide, i.e., a reflected light signal by applying a voltage, an analog light signal can be modulated.

(4) Since the device of the present invention has a light reflecting portion, a light source for transmitting a light signal is not required in the receiving station. Moreover, since the device also has a light receiving portion, the device is assumed to be a single unit in which multi functions such as distribution, reception, transmission and modulation of light are integrated. Thus, reliability and economy of the device of the present invention can be improved.

(5) An amount of reflected light on a light reflecting portion is variable by a modulation voltage, and hence the system can be easily designed or the like.

(6) Since the device of the present invention is constituted to operate a light switching operation, two complimentary outputs can be obtained at a time and the device of the present invention is flexible for being applied to various systems.

(7) Since all the light is incident in a light receiving portion of the device when the light is not modulated, a signal-to-noise ratio of the received signal can be improved.

(8) Since the light receiving portion of the device receives outputted light from a single mode optical fiber, an area for receiving the outputted light can be made small and a wide band signal can be received.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A bidirectional light transmission system for bidirectionally transmitting light of single wavelength comprising:
   a transmitting station having;
      a light source for emitting light of a single wavelength and intensity-modulating a transmission signal,
      a first light branching portion for branching the intensity-modulated light of said light source in a predetermined ratio and outputting one of the branched intensity-modulated light into a single optical fiber transmission line, and further for branching return light inputted from said transmission line, and
      a first light receiving portion for receiving the branched return light from said first light branching portion; and
   a receiving station having;
      a second light branching portion, for receiving the intensity-modulated light from said transmission line and for branching said intensity-modulated light into a first branched light and a second branched light,
      a light phase-modulating portion optically connected to said second light branching portion and for phase-modulating at least one of said first branched light and second branched light,
      a light reflecting portion for transmitting part of said first branched light and part of said second branched light and for reflecting part of said first branched light and part of said second branched light, respective said reflected parts of said first branched light and second branched light being simultaneously intensity-modulated as a return signal in said light phase-modulating portion and said second light branching portion, and said return signal being returned to said transmitting station via said single optical fiber transmission line, and
      a second light receiving portion for receiving the parts of said first branched light and said second branched light transmitted through said light reflecting portion.

2. A bidirectional light transmission system as claimed in claim 1, wherein only when an electric signal is applied on said light phase-modulating portion said reflected part of said first branched light and second branched light are returned from said receiving station to said transmitting station.

3. A bidirectional light transmission system as claimed in claim 1, wherein said transmitting station further comprises a signal selector so that a plurality of multiplex transmitted signals can be transmitted to said receiving station at a higher carrier frequency, and said receiving station returns a selection signal, at a lower carrier frequency so as not to overlap said plurality of multiplex transmitted signals, for driving said signal selector to select and transmit any one of said plurality of multiplex transmitted signals.

4. A bidirectional light transmission system as claimed in claim 1, wherein said light source is a semiconductor laser, a photocoupler or an optical circulator with an m:n ratio, said second light branching portion, said light reflecting portion and said second light receiving portion are made of an optical integrated circuit being integrated on a substrate of glass, or a crystal such as semiconductors or ferroelectric materials, and said optical fiber transmission line is a single mode optical fiber.

5. An optical modulator to be used in a bidirectional light transmission system comprising:
   a body of the optical modulator comprising;
      a single mode optical waveguide for transmitting incident light of a single wavelength;
      a light branching portion for branching light to be transmitted in said single mode optical waveguide into first branched light and second branched light;
      a light intensity modulating portion having parallel electrodes for modulating each of said first branched light and second branched light; and
      a light reflector being provided on an edge surface opposite to an incident side for reflecting part of light of the single wavelength and transmitting part of the light; and
   a light receiver for simultaneously collecting part of the said first branched light and second branched light which are not reflected but transmitted through said light reflector without uniting or mode-coupling said part of said first branched light and second branched light.

6. An optical modulator as claimed in claim 5, wherein said light branching portion is a Y shape branched optical waveguide.

7. An optical modulator as claimed in claim 5, wherein said light branching portion is a directional coupling waveguide.

8. An optical modulator as claimed in claim 5, wherein a single mode optical fiber is provided at a light incident portion of said optical modulator body and said body of the optical modulator has modulation characteristics independent of polarization of light.

9. An optical modulator as claimed in claim 8, wherein said body of the optical modulator having said modulation characteristics independent of polarization of light is made on an X-cut LiNbO$_3$ crystal substrate and has a Y shape branching phase modulating portion, and light is transmitted in the Z axis direction of said crystal and an electric field is applied in the Y axis direction thereof.

10. An optical modulator as claimed in claim 9, wherein an effective refractive index control unit is provided on said light branching portion.

11. An optical modulator as claimed in claim 8, wherein an incident edge surface of said body of the optical modulator to which said single mode optical fiber is connected, is anti-reflection coated, and a light receiving surface of said light receiver is anti-reflection coated or is attached obliquely to an edge surface of said optical modulator so that reflected light from said light receiving surface are not returned to said body of the optical modulator.

12. An optical modulator as claimed in claim 5, wherein a multi-mode optical fiber is used for collecting light by said light receiver.

13. An optical device to be used in a bidirectional light transmission system for bidirectionally transmitting light of single wavelength comprising:
an optical waveguide being formed on a substrate and having an asymmetrical x shape branched waveguide consisting of two Y shaped branched waveguides, one of said two Y shape branched waveguides being as an asymmetrical Y shape waveguide, and a branching interference type light modulating portion;
an electrode for applying an electric field to two branched waveguides constituting said branched interference type light modulating portion in order to perform a switching operation;
an effective refractive index control unit being provided on at least one of said two branched waveguides and independent of said applied voltage;
a light reflecting portion being provided on an output edge of said optical waveguide for reflecting part of the light of single wavelength and transmitting part of the light; and
a light receiving portion for receiving the transmitted light through said light reflecting portion.

14. An optical device as claimed in claim 13, wherein said asymmetrical Y shape branched waveguide is provided on an incident side of said optical waveguide and said reflective branching interference type light modulating portion is provided on an output side of said optical waveguide.

15. An optical device as claimed in claim 14, wherein part of incident light is transmitted through said light reflecting portion, a light receiver is attached just after said light reflecting portion, and two single mode optical fibers are connected to said edge of said asymmetrical Y shape branched waveguide on said incident side.

16. An optical device as claimed in claim 13, wherein said substrate is made of an LiNbO$_3$ or LiTaO$_3$ crystal, light is transmitted in the Z axis direction of said crystal and an electric field is applied in the Y axis direction thereof.

17. An optical device as claimed in claim 13, wherein said crystal substrate is made of an LiNbO$_3$ or LiTaO$_3$ crystal, light is transmitted in the X axis direction of said crystal and an electric field is applied in the Z axis direction thereof.

18. An optical device to be used in a bidirectional light transmission system comprising:
an optical waveguide being formed on a substrate made of an LiNbO$_3$ or LiTaO$_3$ crystal in which the crystal is cut in an X-axis direction, and a Y-axis direction for the crystal for electrical field application, a Z-axis direction of the crystal in which the light is transmitted, and having an asymmetrical Y shape branched waveguide in which respective effective refractive indices of two Y branched optical waveguides differ from each other, a branching interference type light modulating portion having two branched waveguides and a further Y shape branched waveguide, said further Y shape branched waveguide being connected to said asymmetrical Y shape branched waveguide, light being transmitted in said two branched waveguides in the Z-axis direction of said crystal;
an electrode for applying an electric field in the Y-axis direction of said crystal to the two branched waveguides in order to perform a switching operation;
an effective refractive index control unit provided on at least one of said two branched waveguides;
a total light reflector having one output edge of said asymmetrical Y shape branched waveguide for reflecting light transmitted through one branch of said asymmetrical Y shape branched waveguide; and
a light receiving portion provided on another output edge of said asymmetrical Y shape branched waveguide for receiving light transmitted through another branch of said asymmetrical Y shape branched waveguide.

* * * * *

UNITED STATES PATENT AND TRADEMARK OFFICE
CERTIFICATE OF CORRECTION

PATENT NO. : 5,361,157

DATED : November 1, 1994

INVENTOR(S) : T. Ishikawa et al.

It is certified that error appears in the above-identified patent and that said Letters Patent is hereby corrected as shown below:

> Column 18, line 48, after "for" insert --phase- --,
> Column 19, line 38, delete second occurrence "branched"
> and substitute --branching --.

Signed and Sealed this

Twenty-ninth Day of August, 1995

Attest:

BRUCE LEHMAN

Attesting Officer        Commissioner of Patents and Trademarks